United States Patent
Showalter

(10) Patent No.: US 12,486,380 B2
(45) Date of Patent: Dec. 2, 2025

(54) EARTH PLANT COMPOSTABLE BIODEGRADABLE SUBSTRATE AND METHOD OF PRODUCING THE SAME

(71) Applicant: Edward Showalter, Santa Monica, CA (US)

(72) Inventor: Edward Showalter, Santa Monica, CA (US)

( * ) Notice: Subject to any disclaimer, the term of this patent is extended or adjusted under 35 U.S.C. 154(b) by 0 days.

(21) Appl. No.: 18/334,315

(22) Filed: Jun. 13, 2023

(65) Prior Publication Data

US 2023/0407053 A1   Dec. 21, 2023

Related U.S. Application Data

(63) Continuation of application No. 17/878,763, filed on Aug. 1, 2022, now Pat. No. 11,697,725, which is a continuation of application No. 17/447,959, filed on Sep. 17, 2021, now Pat. No. 11,414,533, which is a continuation of application No. 17/133,385, filed on Dec. 23, 2020, now Pat. No. 11,149,131, which is a continuation-in-part of application No. 16/777,783, filed on Jan. 30, 2020, now Pat. No. 10,882,977.

(51) Int. Cl.
| | |
|---|---|
| C08K 11/00 | (2006.01) |
| B29B 7/00 | (2006.01) |
| B29B 7/82 | (2006.01) |
| B29B 7/88 | (2006.01) |
| B29B 9/12 | (2006.01) |
| C08L 23/06 | (2006.01) |

(52) U.S. Cl.
CPC ............ C08K 11/005 (2013.01); B29B 7/005 (2013.01); B29B 7/82 (2013.01); B29B 7/885 (2013.01); B29B 9/12 (2013.01); C08L 23/06 (2013.01); *C08K 2201/002* (2013.01); *C08K 2201/018* (2013.01)

(58) Field of Classification Search
CPC .... C08L 23/06; C08L 3/02; C08L 3/00; C08L 3/04
See application file for complete search history.

(56) References Cited

U.S. PATENT DOCUMENTS

| | | | |
|---|---|---|---|
| 5,115,000 | A | 5/1992 | Jane et al. |
| 5,662,731 | A | 9/1997 | Andersen et al. |
| 5,679,145 | A | 10/1997 | Andersen et al. |
| 6,231,970 | B1 | 5/2001 | Andersen et al. |
| 6,235,815 | B1 | 5/2001 | Loercks |
| 6,379,446 | B1 | 4/2002 | Andersen et al. |
| RE39,339 | E | 10/2006 | Andersen et al. |
| 10,882,977 | B1 | 1/2021 | Showalter |
| 11,149,131 | B2 | 10/2021 | Showalter |
| 2003/0077444 | A1 | 4/2003 | Bond et al. |
| 2007/0021534 | A1 | 1/2007 | Glenn et al. |
| 2008/0103232 | A1 | 5/2008 | Lake |
| 2008/0287592 | A1 | 11/2008 | Favis et al. |
| 2009/0048368 | A1 | 2/2009 | Bash et al. |
| 2010/0314162 | A1 | 12/2010 | Gardner et al. |
| 2011/0158455 | A1 | 6/2011 | Kim et al. |
| 2012/0009387 | A1 | 1/2012 | Wang et al. |
| 2012/0022188 | A1 | 1/2012 | Changping |
| 2012/0139154 | A1 | 6/2012 | Huneault et al. |
| 2012/0288693 | A1 | 11/2012 | Stanley et al. |
| 2012/0289629 | A1 | 11/2012 | Saint-Loup et al. |
| 2012/0315454 | A1 | 12/2012 | Wang et al. |
| 2013/0069280 | A1 | 3/2013 | Altonen |
| 2013/0109781 | A1 | 5/2013 | Lake |
| 2013/0154151 | A1 | 6/2013 | Wang et al. |
| 2013/0158169 | A1 | 6/2013 | Bond et al. |
| 2014/0272370 | A1 | 9/2014 | Broyles et al. |
| 2016/0174684 | A1 | 6/2016 | Ellsworth |
| 2017/0204229 | A1 | 7/2017 | Yuan |
| 2018/0100060 | A1 | 4/2018 | LaPray et al. |
| 2018/0118902 | A1 | 5/2018 | Milazzo |
| 2018/0327588 | A1 | 11/2018 | Marcille |

(Continued)

FOREIGN PATENT DOCUMENTS

| | | |
|---|---|---|
| CN | 101730622 | 6/2010 |
| CN | 101885869 | 11/2010 |
| CN | 103459148 A | 12/2013 |

(Continued)

OTHER PUBLICATIONS

Machine Translation of CN-108690253-A, 2025 (Year: 2025).*
Second review opinion notice, issued by State Intellectual Property Office of China, date of publication Feb. 28, 2024.
Rejection decision, issued by State Intellectual Property Office of China, date of publication May 22, 2024.
Shujun et al. (Journal of Polymers and the Environment, vol. 14, No. 1, Jan. 2006, p. 65-70 )(Year: 2006).
Tsiropoulos et al. (Journal of Cleaner Production 90 (2015) 144-127) (Year: 2015).
Luyt et al 'Morphology Mechanical and Thermal Properties of Composites of Polypropylene and Nanostructured Wollastonite Filler' Polymer Testing, 2009, vol. 28, pp. 348-356.

(Continued)

*Primary Examiner* — Liam J Heincer
(74) *Attorney, Agent, or Firm* — CIONCA IP Law P.C.

(57) ABSTRACT

An earth plant-based compostable biodegradable composition for the formation of a bioplastic and method of producing said resin, the composition comprising: about 17.5 to 45% ethanol-based green polyethylene by weight, about 20 to 25% calcium carbonate by weight, about 2 to 12% hemp hurd or soy protein by weight, about 32 to 45% starch by weight, and about 0.5 to 1% biodegradation additive by weight to enable biodegradation and composting of the bioplastic; wherein the composition is produced by first mill grinding the ethanol-based green polyethylene, calcium carbonate, hemp hurd or soy protein, starch and the biodegradation additive into fine powders, then mechanically mixing the fine powders one by one into a final mixture for about 5-25 minutes at a time, dry and without heat, and then heating the final mixture to about 220 to 430 degrees Fahrenheit.

12 Claims, 12 Drawing Sheets

(56) References Cited

U.S. PATENT DOCUMENTS

2018/0362216 A1    12/2018   Kohn et al.
2021/0095098 A1    4/2021   Soibel et al.

FOREIGN PATENT DOCUMENTS

| | | | |
|---|---|---|---|
| CN | 104910439 | A | 6/2015 |
| CN | 108690253 | A * | 10/2018 |
| CN | 109196056 | | 1/2019 |
| FR | 2954331 | A1 | 6/2011 |
| JP | 2004285210 | A | 10/2004 |
| WO | 1996031561 | A1 | 10/1996 |
| WO | 2009095622 | A2 | 8/2009 |
| WO | 2012142271 | A1 | 10/2012 |
| WO | 2013184822 | A1 | 12/2013 |
| WO | 2017165957 | A1 | 10/2017 |
| WO | 2020069711 | A1 | 4/2020 |

OTHER PUBLICATIONS

'Ethylene-vinyl acetate' Wikipedia Jun. 4, 2019 retrieved from http://en.wikipedia.org/w/index.php?title=Ethylene-vinyl_acetate&oldid=900312892.

Napper 'Environmental Deterioration of Biodegradable, Oxo-biodegradable, Compostable, and Conventional Plastic Carrier Bags in the Sea, Soil, and Open-Air Over a 3-Year Period' Environmental Science and Technology, 2019.

Patent Cooperation Treaty, International Search Report and the Written Opinion of the International Searching Authority, May 7, 2021.

Datta et al. (Process Safety and Environmental Protection 114 (2018) 143-152)(Year: 2018).

Non-Final Office Action issued in U.S. Appl. No. 17/878,763, filed Oct. 12, 2022; USPTO.

Notice of Allowance issued in U.S. Appl. No. 17/878,763, filed May 18, 2023; USPTO.

First Office Opinion Notice, issued by the State Intellectual Property Office of China, date of publication Jul. 2, 2024.

\* cited by examiner

Regarding: D5338 for Earth PCB Samples @ 48.3% Solids @ 52±2°C (50 Days)

| | Inculum | Negative | Positive | EPCB 177 |
|---|---|---|---|---|
| Cumulative Gas Volume (mL) | 1560.9 | 1619.6 | 8244.3 | 4347.5 |
| Percent $CO_2$ (%) | 68.3 | 64.9 | 81.4 | 73.0 |
| Volume $CO_2$ (mL) | 1065.7 | 1050.5 | 6707.0 | 3173.1 |
| Mass $CO_2$ (g) | 2.09 | 2.06 | 13.17 | 6.23 |
| Sample Mass (g) | 1,000 | 10 | 10 | 10.0 |
| Theoretical Sample Mass (g) | 0.0 | 8.6 | 4.2 | 6.2 |
| Biodegraded Mass (g) | 0.57 | 0.56 | 3.59 | 1.70 |
| Percent Biodegraded (%) | | -0.1 | 71.6 | 18.2 |
| Adjusted Percent Biodegraded (%) | | -0.1 | 100.0 | 25.4 |

FIG. 11A

Regarding: D5338 for Earth PCB Samples @ 48.3% Solids @ 52±2°C (50 Days)

| | Inculum | Negative | Positive | EPCB 178 |
|---|---|---|---|---|
| Cumulative Gas Volume (mL) | 1560.9 | 1619.6 | 8244.3 | 5577.3 |
| Percent $CO_2$ (%) | 68.3 | 64.9 | 81.4 | 69.6 |
| Volume $CO_2$ (mL) | 1065.7 | 1050.5 | 6707.0 | 3882.6 |
| Mass $CO_2$ (g) | 2.09 | 2.06 | 13.17 | 7.63 |
| Sample Mass (g) | 1,000 | 10 | 10 | 10 |
| Theoretical Sample Mass (g) | 0.0 | 8.6 | 4.2 | 6.2 |
| Biodegraded Mass (g) | 0.57 | 0.56 | 3.59 | 2.08 |
| Percent Biodegraded (%) | | -0.1 | 71.6 | 24.3 |
| Adjusted Percent Biodegraded (%) | | -0.1 | 100.0 | 34.0 |

FIG. 12A

Regarding: D5511 for Earth PCB Samples @ 48.3% Solids @ 52±2°C (58 Days)

| | Inculum | Negative | Positive | EPCB 179 |
|---|---|---|---|---|
| Cumulative Gas Volume (mL) | 632.4 | 843.7 | 9183.7 | 2545.0 |
| Percent $CH_4$ (%) | 20.5 | 15.7 | 36.4 | 29.6 |
| Volume $CH_4$ (mL) | 130.0 | 132.3 | 3341.2 | 754.4 |
| Mass $CH_4$ (g) | 0.09 | 0.09 | 2.39 | 0.54 |
| Percent $CO_2$ (%) | 48.6 | 44.0 | 44.1 | 40.8 |
| Volume $CO_2$ (mL) | 307.3 | 371.5 | 4053.1 | 1038.1 |
| Mass $CO_2$ (g) | 0.60 | 0.73 | 7.96 | 2.04 |
| Sample Mass (g) | 10 | 10 | 10 | 20 |
| Theoretical Sample Mass (g) | 0.0 | 8.6 | 4.2 | 12.4 |
| Biodegraded Mass (g) | 0.23 | 0.27 | 3.96 | 0.96 |
| Percent Biodegraded (%) | | 0.4 | 88.3 | 5.9 |
| * Adjusted Percent Biodegraded (%) | | 0.5 | 100.0 | 6.6 |

FIG. 13A

8in X 12in X 2mil

EarthPCB 240
MACHINE DIRECTION

| | Elongation to Break % | Tensile PSI |
|---|---|---|
| 1 | 823% | 5,010 |
| 2 | 675% | 3,550 |
| 3 | 822% | 4,820 |
| 4 | 851% | 4,970 |
| 5 | 788% | 4,750 |
| Avg. | 792% | 4,620 |

TRANSVERSE DIRECTION

| | Elongation to Break % | Tensile PSI |
|---|---|---|
| 1 | 825% | 4,380 |
| 2 | 867% | 5,150 |
| 3 | 801% | 4,070 |
| 4 | 852% | 4,240 |
| 5 | 802% | 5,060 |
| Avg. | 829% | 4,580 |

EarthPCB 241
MACHINE DIRECTION

| | Elongation to Break % | Tensile PSI |
|---|---|---|
| 1 | 759% | 4,650 |
| 2 | 826% | 4,850 |
| 3 | 835% | 4,740 |
| 4 | 807% | 4,870 |
| 5 | 797% | 4,630 |
| Avg. | 805% | 4,748 |

TRANSVERSE DIRECTION

| | Elongation to Break % | Tensile PSI |
|---|---|---|
| 1 | 910% | 4,450 |
| 2 | 858% | 4,650 |
| 3 | 849% | 3,790 |
| 4 | 853% | 5,050 |
| 5 | 905% | 4,970 |
| Avg. | 924% | 4,582 |

Ezonyx Film
1.00" x 6.00" x .002" (Average)
20 in/min.
70° F/ 50% RH

FIG. 14A

Strength Packaging Test Results
Plant Based Bioplastic vs HDPE Plastic

PLANT-BASED SAMPLE 1
MACHINE DIRECTION

|   | Elongation to Break % | Tensile PSI |
|---|---|---|
| 1 | 1013% | 7,380 |
| 2 | 980% | 4,750 |
| 3 | 989% | 4,980 |
| 4 | 1001% | 5,030 |
| 5 | 938% | 4,570 |
| Avg. | 984% | 5,342 |

PLANT-BASED SAMPLE 1
TRANSVERSE DIRECTION

|   | Elongation to Break % | Tensile PSI |
|---|---|---|
| 1 | 774% | 3,520 |
| 2 | 978% | 4,810 |
| 3 | 989% | 5,100 |
| 4 | 924% | 4,650 |
| 5 | 982% | 5,030 |
| Avg. | 929% | 4,622 |

PLANT-BASED SEAL SAMPLE 1
MACHINE DIRECTION

|   | Elongation to Break % | Tensile PSI |
|---|---|---|
| 1 | 460% | 2,240 |
| 2 | 218% | 2,120 |
| 3 | 643% | 2,590 |
| 4 | 431% | 2,220 |
| 5 | 144% | 2,000 |
| Avg. | 379% | 2,234 |

Regular SAMPLE 2
MACHINE DIRECTION

|   | Elongation to Break % | Tensile PSI |
|---|---|---|
| 1 | 815% | 4,140 |
| 2 | 781% | 4,010 |
| 3 | 805% | 4,130 |
| 4 | 797% | 3,980 |
| 5 | 767% | 3,680 |
| Avg. | 793% | 3,988 |

Regular SAMPLE 2
TRANSVERSE DIRECTION

|   | Elongation to Break % | Tensile PSI |
|---|---|---|
| 1 | 885% | 3,740 |
| 2 | 854% | 3,820 |
| 3 | 890% | 3,980 |
| 4 | 849% | 3,870 |
| 5 | 878% | 3,880 |
| Avg. | 871% | 3,818 |

Regular SEAL SAMPLE 2
MACHINE DIRECTION

|   | Elongation to Break % | Tensile PSI |
|---|---|---|
| 1 | 88% | 2,300 |
| 2 | 139% | 2,180 |
| 3 | 152% | 2,280 |
| 4 | 135% | 2,200 |
| 5 | 104% | 2,190 |
| Avg. | 124% | 2,230 |

FIG. 14B

EARTH PLANT COMPOSTABLE BIODEGRADABLE SUBSTRATE AND METHOD OF PRODUCING THE SAME

CROSS-REFERENCE TO RELATED APPLICATIONS

This application is bba continuation and claims the benefit of U.S. Non-Provisional application Ser. No. 17/447,959, filed Sep. 17, 2021, which is a continuation of U.S. Non-Provisional application Ser. No. 17/133,385, filed Dec. 23, 2020, now U.S. Pat. No. 11,149,131, which is a continuation-in-part of U.S. Non-Provisional application Ser. No. 16/777,783, filed Jan. 30, 2020, now U.S. Pat. No. 10,882,977, which are hereby incorporated by reference, to the extent that they are not conflicting with the present application.

BACKGROUND OF INVENTION

1. Field of the Invention

The invention relates generally to compositions, and more specifically to an earth plant-based composition having eco-friendly sustainable properties, which can be effectively used to produce bioplastic without the use of plasticizers or thermoplastic starch additives, using organic, sustainable, renewable or recyclable material sources to produce masterbatch of bioplastic resins—biopolymers for use in durable goods, food, and beverage containers, cosmetic, and healthcare packaging, medical devices, automotive materials, all types of packaging materials, and any other related applications that are currently made from petroleum-based plastic materials.

2. Description of the Related Art

Petroleum-based resins, such as polyethylene phthalate, polyethylene, polypropylene, polyethylene terephthalate, nylon, polyolefin, and plasticized polyvinyl chloride (PVC) and many other similar or related petroleum-based resins, are widely used today for a wide range of applications, such as for packaging materials, automotive parts, home appliances, toys, and the like. However, such petroleum-based resins are not compostable or biodegradable, thereby causing environmental harm, in the form of greenhouse gas emissions, pollution, landfill issues, ocean filled with plastic and human health issues.

In response to such effects, scientists and engineers have tried to develop biopolymers (bio based resins), typically polylactic acid (PLA) resins. PLA resins have become popular, and are widely considered as an alternative to petroleum-based plastics. However, there are several issues, challenges, and limitation with the use of PLA resin for durable goods and other plastic products.

PLA resin has temperature issues and melts in sunlight or increased temperatures such as hot water or deconstructs in a microwave and cannot be used in products that are placed in a dishwasher. If a PLA bottle is left in an automobile in the hot summer temperatures that bottle would melt, disintegrate into a messy blob of goop in that environment. PLA is also brittle, thus it cannot be used in durable goods applications.

PLA resin is also difficult to injection mold and does not process well in existing injection molding equipment. It is not durable in cold temperatures either. There are many challenges in trying to blow mold PLA resin or extrude it. To blow mold PLA resin, a chemical additive may be added, thereby contaminating the PLA property to be bio-based. Further, during processing, the PLA resin must be pre-dried in an oven before using it in plastic industry application, such as injection molding, extruding, blow molding etc. As an example, this causes an increase in labor, equipment, and energy costs. Also, PLA can't be recycled with other plastics, such as PE.

Moreover, another issue is high costs associated with producing (PLA) polylactic acid resin, and its current limited supply, along with its limited ability as a durable goods bioplastic, renders this alternative to petroleum-based plastic economically infeasible.

Additionally, (PLA) polylactic acid resins have poor durability properties, poor heat temperature resistance or cold resistance temperature properties, and lack moisture resistance barriers or the flexibility necessary for certain applications, such as high impact durable goods, packaging films, bottles, automotive parts, cosmetic packaging and toys, just to name a few of issues with using PLA for industrial and consumer goods. The mechanical properties of PLA resin, and also of PHA (Polyhydroxyalkanoates) resin are lacking in comparison with petroleum-based resin (e.g., high flow rate of PLA and PHA makes them both unsuitable for blow molding; unsuitable for durable goods).

It has been suggested and common that low-molecular weight flexibilitizers or plasticizers be added to the PLA or PHA resins, which are not organic/bio-based, or additives to be added to slow the melt flow rate, which, again, are chemicals that are not bio/organic-based materials. However, products made from PLA or PHA, such as packaging films, straws, consumer products, still exhibit poor stability, brittleness, temperature issues, moisture issues, rendering the PLA and PHA resin disadvantageous. In addition, testing revealed that the currently available additives make the resulting compositions non-biodegradable, non-compostable, and not from a sustainable or a renewable material source.

Alternatively, Green PE (e.g., I'm Green™)—Green polyethylene, polypropylene (PP), polyethylene terephthalate (PET) or other "green" copolymers that could be derived from an organic, sustainable renewable material source like sugarcane, sugar beet, or corn have been employed in compositions as an alternative for petroleum-based polyethylene, polypropylene, polyethylene terephthalate and other polymers made from petroleum. These green (plant-based) polymers, such as PE, PP, PET, combine high-performance and processability. Plastics made from Green PE, Green PP, Green PET and other polymers are recyclable similar to conventional plastic polymers, such as polyethylene, polypropylene, polyethylene terephthalate products, and Green PE, PP, PET Green polymers are also known as a sustainable renewable material source, and therefore provides the ability to help reduce greenhouse gas emissions. However, Green polymers such as Green PE, Green PP and Green PET are not biodegradable or compostable and may still contribute to the pollution of landfills and oceans. There has not been any economically feasible technology developed to produce a Green PE, PP or PET that is biodegradable or bio-compostable, thus truly "Green."

Global annual petroleum polymer resin production will exceed 700 billion pound in 2020, and we still do not have a viable economically feasible, sustainable, renewable biodegradable and bio-compostable resin solution to our global tsunami waste stream of regular plastic going into our landfills, oceans, and rivers, and our atmosphere.

Likewise, a stone-based copolymer substrate resin has been developed as a replacement composition for tree-based paper, hard paper and limited plastic goods. More particularly this substrate resin relates to a limestone-based copolymer substrate, which may be used as a replacement composition for limited goods currently manufactured from tree-based or petroleum-based substances. Due to the stone-based copolymer substrate resin brittleness and inability to be applied in making films, flexible products, be used to extrude products as well extrude blow mold, the resin cannot be used to generally replace petroleum-based plastic products. Moreover, stone-based resin contains a high concentration of calcium carbonate (CaCo3) ranging from approximately fifty to eighty-five percent (50-85%) by weight and varying in diameter generally from 2 to 4 microns. Because of the presence of the calcium carbonate, products made from the stone-based resin have disadvantages of an increase in brittleness, haze, a major decrease in transparency, decrease in flexibility and durability. Thus, there have been many limitations of the fields and applications to which this resin is applicable.

Due to the limitations of the above attempts, plastics currently available in the marketplace are typically still petroleum-based, which require large amounts of processing energy and cost to produce. Unfortunately, petroleum is derived from crude oil, which is often in limited supply and in high demand. Further, crude oil is not a renewable material. Worse, petroleum-based plastic products are typically not biodegradable or bio-compostable, which creates a tremendous environmental problem globally, including by causing disposal issues once the product has been used.

In general, there has been no real sustainable, bioplastic material developed that can be economically scaled for mass production, that is economically feasible, and can be used to replace a wide range of petroleum-based plastic products used today in the global market.

Therefore, there is a need to solve the problems described above by providing an economically feasible, earth plant-based compostable and biodegradable composition having eco-friendly properties, and scalable methods of manufacturing said resins globally.

The aspects or the problems and the associated solutions presented in this section could be or could have been pursued; they are not necessarily approached that have been previously conceived or pursued. Therefore, unless otherwise indicated, it should not be assumed that any of the approaches presented in this section quality as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an earth plant-based compostable biodegradable (EarthPCB) composition is provided comprising a composition of blended earth and copolymer substrates. The composition may be provided with ethanol-based Green polyethylene (e.g., I'm Green™ Polyethylene) from approximately fifteen percent to seventy-five percent (15-75%) by weight. The composition may also include calcium carbonate (CaCO3) from approximately fifteen to sixty percent (15-60%) by weight. The composition may also include hemp hurd, which is 100% biodegradable and recyclable, and may be provided from two percent up to seventy-five percent (2-75%) by weight. The composition may also include starch, which is 100% biodegradable on its own, and may be provided from about twenty percent up to sixty percent (20-60%) by weight. The EarthPCB resin may also include a biodegradation additive from approximately half of a percent up to ten percent (0.5-10%) by weight. Thus, an advantage of the EarthPCB substrate may be that resulting products are as strong or stronger than petroleum-based plastic, while also being compostable, biodegradable, recyclable and non-toxic to the environment.

In another aspect, an earth plant-based compostable biodegradable composition is provided, wherein the composition may include soy protein, soy polyols, or soy plastic provided from approximately two percent to ten percent (2 to 10%) by weight. The EarthPCB resin may be provided with the soy protein in substitution of the hemp hurd, resulting in a composition comprising ethanol-based Green polyethylene, calcium carbonate, soy protein, biodegradation additive (e.g., EcoPure®) and starch. Thus, an advantage of the EarthPCB composition with the substituted soy protein may be that the resulting products are as strong or stronger than petroleum plastic, yet they are compostable, biodegradable, recyclable and non-toxic to the environment. An additional advantage may be that the components that make up the EarthPCB composition are widely available and cost-effective, rendering the resin an affordable and renewable alternative to petroleum-based plastic resins.

In another aspect, a method of making an earth plant-based compostable biodegradable composition is provided. The EarthPCB resin may comprise an ethanol-based PE, calcium carbonate, hemp hurd, starch, biodegradation additive, soy protein and biopolymer. The method of producing the earth plant-based compostable biodegradable composition may involve first milling the substrate copolymers into a fine powder, wherein each particle of the powder is approximately of the diameter 0.25 to 3.0 micrometers (microns). The green polyethylene may be milled to a fine powder of about 0.25 to 3.0 microns, and the substrate calcium carbonate may be milled to a fine powder of about 0.25 to 3.0 microns, and the two powders may be mechanically mixed together, forming a first mixture. The substrate hemp hurd may be milled to a fine powder of about 0.25 to 3.0 microns and mechanically mixed and blended dry with the first mixture, forming a second mixture. Then, the substrate starch may be milled to a fine granulated powder of about 0.25 to 3.0 microns and mechanically mixed and blended dry with the second mixture, forming a third mixture. The substrate biodegradation additive may be milled to a fine granulated powder of about 0.25 to 3.0 microns and then mechanically mixed and blended dry with the third mixture, forming the final EarthPCB composition. The biopolymer may then be heated to between about 220- and 360-degrees Fahrenheit (F) to achieve thermodynamic activation of the biopolymer, thus forming a polymer resin blend. Thus, an advantage of the method of producing the EarthPCB substrate may be that all components of the resin blend evenly and are blended dry without the need of applying heat during the mixing process. An additional advantage of the method of producing the EarthPCB substrate may be that the manufacturing process requires relatively low energy consumption.

In another aspect, an exemplary method of producing an earth plant-based compostable biodegradable substrate resin in pelletized form is provided. The method of producing the EarthPCB substrate copolymer may be provided with ethanol-based Green polyethylene from approximately 50 to 65% by weight, starch from approximately 30 to 50% by weight, and biodegradation additive from approximately 2 to 10% by weight. The method of producing the EarthPCB substrate copolymer may include first mill grinding each substrate copolymer separately into fine powders of about 0.25 to 3.0 microns. These fine powders may then be blended uniformly in a mechanical mixer for about 5 to 25 minutes for each powder, adding each substrate copolymer one at a time during the mixing process. The fine powders are blended dry with no heat in the mechanical mixer. When all three of the substrate copolymers have been mechanically agitated together dry, the complete mixture of substrate may be heated at a temperature of between about 220- and 360-degrees F. to achieve thermodynamic activation, thus establishing cohesion between each substrate copolymer and resulting in a substrate resin. Finally, the substrate resin may be cured at a temperature between about 250- and 360-degrees F. to form pelletized bioplastic that may be used in various manufacturing processes for the production of bioplastic products. Thus, an advantage of the method of producing the substrate resin may be that the resin can be used as a material to form numerous types of food and beverage containers, packaging, film, and similar plastic products. An additional advantage of the method may be that the resulting products will be recyclable, compostable and biodegradable.

In an aspect, an earth plant-based compostable biodegradable (EarthPCB™) composition is provided comprising a composition of blended earth and copolymer substrates. The composition may be provided with ethanol-based Green polyethylene made from different type of organic materials such as corn, sugarcane, sugar beets, cellulosic, or other plant-based ethanol Earth polyethylene or Green polyethylene (e.g., EarthPE™).

The above aspects or examples and advantages, as well as other aspects or examples and advantages, will become apparent from the ensuing description.

BRIEF DESCRIPTION OF THE DRAWINGS

For exemplification purposes, and not for limitation purposes, aspects, embodiments or examples of the invention are illustrated in the figures of the accompanying drawings, in which:

FIGS. 11A-C, 12A-C, 13A-C show results of biodegradation testing performed on plastic made from three particular formulas of the earth plant-based compostable biodegradable composition, EPCB 177, EPCB 178, EPCB 179, respectively.

FIG. 14A shows results of strength tests performed on plastic made from two particular formulas of the earth plant-based compostable biodegradable composition, EPCB 240, EPCB 241, respectively.

FIG. 14B shows results of strength tests performed on plastic made from plant-based polyethylene versus petroleum-based polyethylene.

DETAILED DESCRIPTION

Figure 1A:
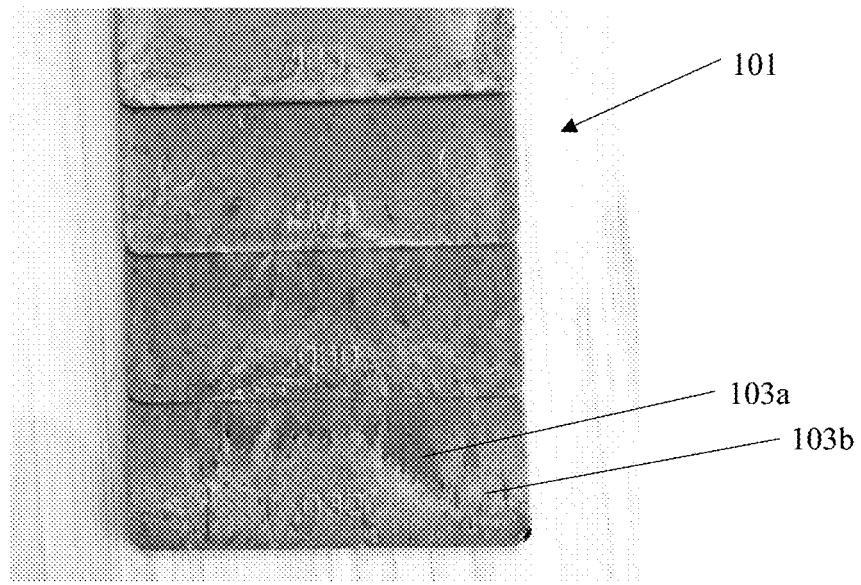
FIGS. 1A-1B illustrate exemplary embodiments of the earth plant-based compostable biodegradable composition made during testing, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some components or steps that are known in the art are not shown or described if they are not necessary for the invention to be understood by one of ordinary skills in the art.

For the following description, it can be assumed that most correspondingly labeled elements across the figures possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

The present invention relates to an earth plant-based (EarthPCB) composition and methods having eco-friendly properties, which can be effectively used to replace petroleum-based plastic. The EarthPCB composition may include additional advantageous properties, such as improved strength in bioplastic material, improved flexibility, moisture resistance, oxygen barrier, possible biodegradable properties, and composting. The materials that form the EarthPCB are also widely available and relatively low-cost. As will be described in this disclosure, the EarthPCB composition may comprise a polymer resin compounding of earth-based materials, a plant-based material resin comprising a hard pellet resin segment and soft segments. The hard pellet resin segment may comprise calcium carbonate ($CaCO_3$) and the soft segments may comprise starch, hemp hurd, an ethanol-based Green polyethylene and a well-known biodegradation additive (e.g., EcoPure®). These segments may enable products made from the EarthPCB resin to compost and biodegrade after use, while also being non-toxic. Thus, an advantage may be that the earth plant compostable resin-based bioplastic can be used to replace petroleum-based plastics that are currently used in food and beverage packaging, as well as in other types of consumer products.

In an aspect, the EarthPCB composition may be provided with an ethanol-based Green polyethylene from approximately fifteen percent to seventy-five percent (15-75%) by weight in a preferred form of finely ground powder of about 0.25 to 3.0 micrometers (microns). The EarthPCB resin substrate may also be provided with CaCO3 from approximately fifteen to sixty percent (15 to 60%) by weight of fine powder generally in the preferred approximate diameter of 0.25-3.0 microns. The presence of calcium carbonate in the EarthPCB may be advantageous for particular applications wherein white plastic is desirable, such as in pill bottles, shampoo bottles, etc. Because calcium carbonate is naturally white, it may decrease the need for white colorant, which may decrease the cost of producing the EarthPCB for such applications. An additional advantage is that the EarthPCB uses lower concentrations of calcium carbonate than those of stone-based resins, which makes the EarthPCB composition less brittle.

The EarthPCB resin substrate may also be provided with hemp hurd from approximately two to seventy-five percent (2-75%) by weight milled into a fine powder of about 0.25 to 3.0 microns, as an example. Using hemp hurd to produce plastic may be a far better option than petroleum-based plastic as it is 100% biodegradable and recyclable. The EarthPCB resin substrate may also include starch, which is derived from starch granules that occur in plants (e.g., potatoes, wheat, rice, corn, cassava). The starch may be provided from approximately twenty percent to sixty percent (20-60%) by weight milled into a fine powder of about 0.25- to 3.0-micron particles.

Lastly, the EarthPCB resin may be provided with biodegradation additive in approximately one-half percent to ten percent (0.5-10%) by weight milled into a fine powder of about 0.25 to 3.0 microns, as an example. The biodegradation additive enables the products formed with the EarthPCB composition to biodegrade within 60 to 180 days under anaerobic conditions under ASTM D5511 (Standard Test Method for Determining Anaerobic Biodegradation of Plastic Materials), as well as compost in 30 to 90 days under anaerobic conditions. Thus, an advantage of the EarthPCB composition may be that bioplastic products made from the resin are as strong or stronger than petroleum plastic, yet they are compostable, biodegradable, recyclable and non-toxic to the environment.

It should be understood that within the ranges described above, various EarthPCB compositions can be formulated. Of the five components described above, tests revealed that three of the five components are critical to obtaining a suitable EarthPCB. These three components are the ethanol-based Green polyethylene, the starch, and the biodegradation additive. In an example, one may choose to combine 75% Green polyethylene by weight with 20% starch by weight, and 5% biodegradation additive by weight. In another example, one may choose to combine all five of the above components into a single composition, by ensuring the ratio of each component falls within the range described above for each component, and that the total of the ratios equals 100%, for example as follows: 40% Green polyethylene by weight, 20% calcium carbonate by weight, 15% hemp hurd by weight, 24.5% starch by weight and 0.5% biodegradation additive by weight.

In another aspect, the EarthPCB composition may be provided with soy protein as a substitute for the hemp hurd raw material. The EarthPCB composition with the substituted soy protein may thus comprise the soy protein from approximately two to ten percent (2-10%) by weight milled into a fine powder of about 0.25 to 3.0 microns in diameter. The remaining biopolymers (e.g., starch and Green polyethylene) may be provided in the same amounts by weight and of the same particle diameters as described previously above. Thus, an advantage of the EarthPCB composition with the substituted soy protein may be that products made with the resin are as strong or stronger than petroleum plastic, and are compostable, biodegradable, recyclable and non-toxic to the environment.

The EarthPCB resin described above may be produced from the following preferred formulas. A first exemplary formula of the EarthPCB composition may comprise 25% calcium carbonate by weight, 12% hemp hurd by weight, 17.5% Green polyethylene by weight, 45% starch by weight and 0.5% EcoPure® additive by weight.

In another exemplary formula, the EarthPCB composition may comprise 25% calcium carbonate by weight, 2% hemp hurd by weight, 27.5% Green polyethylene by weight, 45% starch by weight and 0.5% EcoPure® additive by weight.

In another exemplary formula, the EarthPCB composition may comprise 25% calcium carbonate by weight, 6% hemp hurd by weight, 23.5% Green polyethylene by weight, 45% starch by weight and 0.5% EcoPure® additive by weight.

In another exemplary formula, the EarthPCB composition may comprise 20% calcium carbonate by weight, 2% hemp hurd by weight, 45% Green polyethylene by weight, 32% starch by weight and 1% EcoPure® additive by weight.

In another exemplary formula, the EarthPCB composition may comprise 60% Green polyethylene by weight, 37% starch by weight and 3% EcoPure® additive by weight.

In another exemplary formula, the EarthPCB composition may comprise 25% calcium carbonate by weight, 2% hemp hurd by weight, 27.5% Green polyethylene by weight, 45% starch by weight and 0.5% EcoPure® additive by weight.

In a final exemplary formula, the EarthPCB composition may comprise 25% calcium carbonate by weight, 2% soy protein by weight, 27.5% Green polyethylene by weight, 45% starch by weight and 0.5% EcoPure® additive by weight.

As shown by the above preferred formulas, at least three of the substrate copolymers would need to be used to achieve a resin that is biodegradable and compostable. Those three substrate copolymers would be Green polyethylene from approximately fifty to seventy percent (50 to 70%) by weight, starch from approximately thirty to fifty percent (30 to 50%) by weight and biodegradation additive (e.g., EcoPure®) from approximately two to ten percent (2 to 10%) by weight. Thus, an advantage of the EarthPCB composition disclosed herein may be that bioplastic products made from the EarthPCB resin may be compostable, biodegradable and recyclable, even when using only the at least three substrate copolymers.

In tests conducted, EarthPCB resins made of two of the exemplary formulas described above were analyzed. These compositions, called "EPC 104" and "EPC 105," were tested according to impact (ASTM D256), tensile (ASTM D638), melt flow (ASTM D1238), specific gravity (ASTM D792), and ash test (ASTM D5630), as shown in Table 1 below. EPC 104 represents the exemplary embodiment of the EarthPCB resin comprising 25% calcium carbonate by weight, 2% hemp hurd by weight, 27.5% Green polyethylene by weight, 45% starch by weight and 0.5% EcoPure® additive by weight. EPC 105 represents the exemplary embodiment of the EarthPCB resin comprising 25% calcium carbonate by weight, 6% hemp hurd by weight, 23.5% Green polyethylene by weight, 45% starch by weight and 0.5% EcoPure® additive by weight.

TABLE 1

| [55]<br>Compound | Specific<br>Gravity<br>(g/cm3) | Impact<br>(Ftlb/in) | Tensile<br>(psi) | Elongation<br>(%) | Tensile<br>Modulus<br>(psi) | Melt<br>Flow<br>(g/10min) |
|---|---|---|---|---|---|---|
| EPC 104 | 1.35 | 0.30 | 1,689 | 0.62 | 319,162 | 0.75 |
| EPC 105 | 1.38 | 0.32 | 1,542 | 0.43 | 412,098 | 0.13 |

In particular, the compositions were tested against a PLA resin. It should be noted that during testing, it was observed that the presence of the starch in the composition lowered the melt flow rate to about 4.26 g/10 min on its own. Furthermore, as shown in Table 1, EPC 104 dropped the melt flow rate to under 1 g/10 min and EPC 105 dropped the melt flow rate to under 0.2 g/10 min, compared to the melt flow rate of the PLA resin, which is 7.5 g/10 min. As demonstrated by these results, an advantage of the EarthPCB resin may be the slowing of the melt flow rate, which may can be useful is certain applications and manufacturing processes. In another example test, the tensile modulus improved significantly due to the EarthPCB resins. The PLA resin's modulus is 190,000 psi, and EPC 105, which had the highest improvement, had a tensile modulus of 412,098 psi, as shown in Table 1. Thus, an additional advantage of the EarthPCB resin may be that bioplastics formed from the resin are stronger than PLA-based plastics.

Figure 1B:
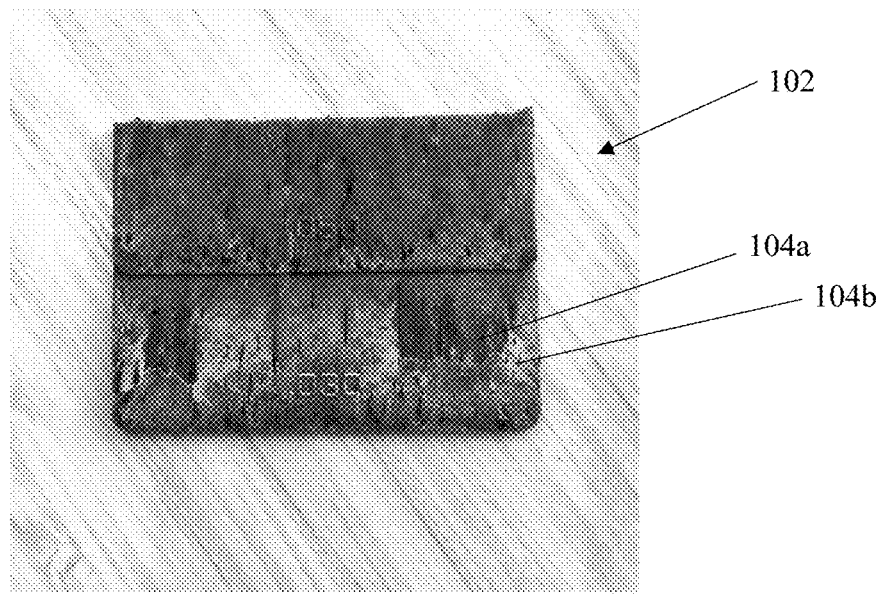

FIGS. 1A-1B illustrate exemplary embodiments of the earth plant-based compostable biodegradable composition made during testing, according to an aspect. FIG. 1A illustrates the exemplary embodiment EPC 104 discussed above (shown by 101). FIG. 1B illustrates the exemplary embodiment EPC 105 discussed above (shown by 102). The exemplary embodiments shown in FIGS. 1A-1B were made using traditional curing methods, by first melting down each component and mixing their melted forms. As shown in FIGS. 1A-1B, the EarthPCB resin embodiments made using this method vary in coloration and uniformity throughout the pieces of bioplastic 101, 102. For example, the presence of the darker areas 103a, 104a and the presence of the lighter areas 103b, 104b indicate nonuniform blending of the components during mixing in each of the EarthPCB embodiments. This nonuniform blending may cause nonuniform strength throughout, which may make the resulting bioplastic more prone to failure in particular applications.

As will be discussed in further detail herein below, during testing it was discovered that the mill grinding of each of the components before mixing the resin allows each component to blend uniformly.

In an aspect, a method of producing the EarthPCB composition is provided. The method of producing the EarthPCB resin substrate may first involve mill grinding each copolymer separately into a fine powder, wherein each particle is about 0.25 to 3.0 microns in diameter. The substrate copolymers may be Green polyethylene, CaCO3, hemp hurd, starch, biodegradation additive and optionally soy protein meal, as an example, and may be provided in solid state. Preselected amounts of each substrate copolymer may be measured out for producing the EarthPCB composition. The substrate copolymers may be ground or pulverized into this diameter range to enable a fine, powdered blending of each of the copolymers into a uniform composition. The particle size of the powdered copolymers may be measured via geometric methods, such as microscopy or sieving. In a preferred exemplary embodiment, the hemp hurd may be milled into a fine powder about 0.25 to 0.75 microns in diameter. Hemp hurd fibers, which form the inner core of the hemp stalk, are generally woody and therefore do not compound well or blend evenly on their own. Thus, when the hemp hurd is ground to a fine powder of about 0.25 to 0.75 microns in diameter, it blends and compounds more uniformly with the other substrate copolymers. Thus, an advantage of milling the hemp hurd into this fine powder size may be that the EarthPCB resin is stronger, more flexible, compostable and biodegradable.

Once each of the substrate copolymers are blended generally in the range from about 0.25 to 3.0 microns, the copolymers may be blended together and mechanically mixed with no heat. As an example, each component may be added one at a time to the mix in a mechanical mechanism, wherein the mixture is mixed for about 5 to 25 minutes at a time before the next substrate copolymer is added. Once all of the substrate copolymers have been mechanically agitated together dry, the resulting mixture may be heated to a temperature between about 220- and 360-degrees F. The heating of the final mixture of substrate achieves thermodynamic activation within the mixture, such that cohesion is established between each substrate copolymer of the mixture. The heating of the final mixture results in the final EarthPCB resin disclosed herein above. Thus, an advantage of the method of producing the EarthPCB resin may be that the resin can be used as a material to form numerous types of food and beverage containers, packaging, film, and similar plastic products. An additional advantage of the method may be that the resulting products will be recyclable, compostable and biodegradable.

The EarthPCB resin may be manufactured into an array of products and goods through thermoforming, blow molding, injection molding, bubble forming, vacuum farming, and pelletizing, as an example. The EarthPCB resin may be pelletized via a process involving extrusion, cutting the extruded strands, and curing to produce bioplastic products. It should be understood that because of the mill grinding of each of the components that make up the composition, the curing process of the composition will be faster, thus reducing warehousing costs before production of various products made of the EarthPCB resin. As is known to one of ordinary skills in the art, pelletizing is the process of compressing or molding the substrate into the shape of a small pellet. These pellets can then be shipped to various manufacturers who use the pellets in their specific manufacturing processes such as injection molding, extrusion film, blow molding, etc. The melt flow rate of the EarthPCB substrate material under thermoforming, as an example, can be from about 7.5 to 4.26 g/10 min. A modifier in the form of an additive could be applied to the substrate to adjust the melt flow rate to about 7 to 3.5 g/10 min, as an example.

It should be understood that impact modifiers or temperature modifiers could be added to the substrate to make an obvious adjustment to the resin substrate's properties. As an example, an impact modifier could be added to the substrate to give products more strength if produced from the resin.

The EarthPCB composition may be provided with a method of producing bioplastic made from the EarthPCB resin, in an aspect. The method of producing the EarthPCB composition for forming bioplastic may first involve milling Green polyethylene and calcium carbonate into fine powders about 0.25 to 3.0 microns in diameter, and then mechanically mixing the two powders together, forming a first mixture. Hemp hurd may be milled into a fine powder about 0.25 to 3.0 microns in diameter and then mechanically mixed and blended dry with no heat with the first mixture, forming a second mixture. The second mixture thus comprises the mixed Green polyethylene, calcium carbonate and hemp hurd. It should be understood that soy protein could replace the hemp hurd in this exemplary method. Then, starch may be milled to a fine granulated powder about 0.25 to 3.0 microns in diameter and may be mechanically mixed and blended dry with no heat with the second mixture, forming a third mixture. Finally, the third and final mixture may be agitated at a temperature between about 220- and 360-degrees F. to thermodynamically activate and link material structures within each substrate copolymer, forming the EarthPCB resin. Blended material structural units are linked in a linear or branched manner via the heating bonding process. The EarthPCB resin may be cured at about 250- to 360-degrees F. to form a bioplastic in the form of a pelletized material. The pelletized material may then be used to form food and beverage products by extruding, blow molding injection, injection mold, etc. Thus, an advantage of the method of producing bioplastic from the EarthPCB resin may be that products currently made from plastic can now be made from compostable and biodegradable resin.

Traditional resin curing and mixing methods involve first melting down pelletized forms of each ingredient that makes up the composition. As disclosed above, the method of producing the EarthPCB resin involves mixing all ingredients into a final mixture in a powdered form, rather than mixing melted down pellets. Thus, an advantage of the method disclosed above may be that each component making up the composition may be mixed and blended dry with no heat.

It should be understood that the above described exemplary embodiments of the EarthPCB composition may be used specifically for a variety of applications. As an example, for the production of films for packaging, for example, hemp hurd or soy protein and calcium carbonate would preferably not be used in the making of the EarthPCB composition, as they could disrupt the integrity of the resulting film.

What follows is a description of various other aspects, embodiments and/or examples in which the invention may be practiced. Reference will be made to the attached drawings, including the tables and charts therefrom, and the information included in the drawings is part of this detailed description. Specifically, reference will be made to the tables showing data from the tests conducted of EarthPCB master batch resin made in various aspects of a variety of the exemplary formulas described below. These compositions called EarthPCB or EPCB were tested in various aspects, embodiments and/or examples in which the invention may be practiced.

The present invention relates to an earth plant based (EarthPCB) composition and methods of making and using the same, the composition having eco-friendly properties, and being suitable to be used in applications having the requirement for a wide spectrum of temperature ranges, from freezing low temperatures below 32 degrees Fahrenheit or temperatures above 212 degrees Fahrenheit boiling water, which can thus be effectively used to replace petroleum-based plastic.

Figure 2:
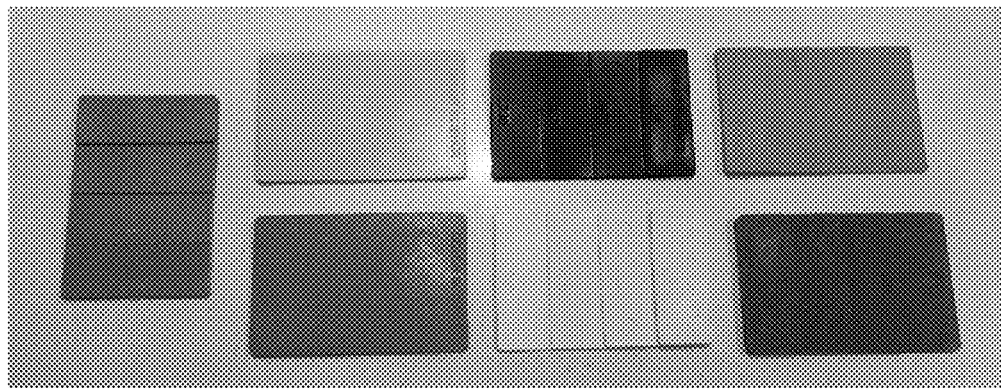
FIG. 2 illustrate other exemplary sample products made from the earth plant based compostable biodegradable composition made during testing, according to an aspect.

FIG. 2 illustrate other exemplary sample products made from the earth plant based compostable biodegradable composition made during testing, according to an aspect. It should be noted that because of the employment of the preferred blending method described hereinafter, the plastic products have color and structural uniformity (unlike the test samples from FIGS. 1A-B).

Figure 3:
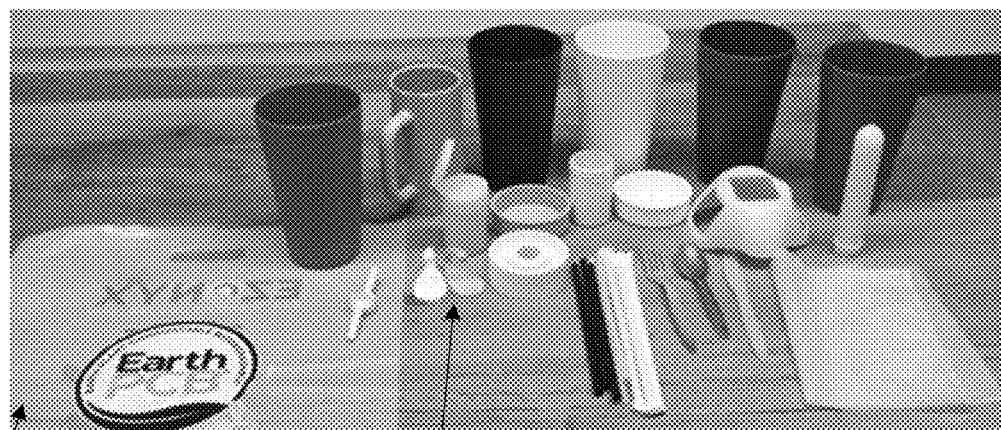
FIG. 3 illustrate various products that were successfully manufactured from the earth plant-based compostable biodegradable composition, showing its broad suitability, according to an aspect.

FIG. 3 illustrate various products that were successfully manufactured from the earth plant-based compostable biodegradable composition, showing its broad suitability, according to an aspect. For example, hooks 311, that could be used to hang clothing, can be made of EarthPCB that is rigid, not flexible. EarthPCB that is rigid could be used in the cosmetic industry to produce cosmetic packaging making it biodegradable and compostable. The cosmetic industry is seeking sustainable, renewable packaging. That can be provided by the composition for production of a rigid bioplastic for the cosmetic industry and other applications that require a rigid material, as disclosed in this application.

The following are some examples of compositions that can be used for production of a bioplastic for cosmetic industry, or other rigid material applications, such as wall hooks, automotive parts, boxes for electronics, packaging for rigid walls, the composition being compostable and biodegradable.

A composition for production of a bioplastic for cosmetic industry or other rigid applications that is compostable and biodegradable, the composition comprising 40% plant-based polyethylene, 15% polyethylene, 25% CaSiO3 Wollastonite, 10% CaCo3, 7% starch, 3% biodegradation additive, all ratios being by weight.

A composition for production of a bioplastic for cosmetic industry or other rigid material applications, such as wall hooks, that is compostable and biodegradable, the composition comprising of 65% plant-based polyethylene, 25% CaSiO3 Wollastonite, 7% CaCo3, 3% biodegradation additive, all ratios being by weight.

A composition for production of a bioplastic for cosmetic industry or other rigid material applications, such as wall hooks or boxes, or packaging for rigid walls that is compostable and biodegradable, the composition comprising 35% plant-based polyethylene, 25% polyethylene, 30% CaSiO3 Wollastonite, 8% CaCo3, 2% biodegradation additive, all ratios being by weight.

A composition for production of a bioplastic for cosmetic industry or other rigid material applications, such as wall hooks, automotive parts, boxes for electronics, packaging for rigid walls that is compostable and biodegradable, the composition comprising 62% plant-based polyethylene, 20% CaSiO3 Wollastonite, 15% CaCo3, 3% biodegradation additive, all ratios being by weight.

Another example of such composition, that is suitable for production of a bioplastic for cosmetic industry or other rigid material applications, comprises a range of 25% to 75% plant-based polyethylene by weight, 10% to 50% CaSiO3 Wollastonite by weight, 1% to 25% CaCO3 by weight, 1% to 30% starch by weight, 1% to 4% biodegradation additive by weight, 1% to 8% color additive by weight.

As another example, the EarthPCB bag 312 was tested with dry ice (frozen form of carbon dioxide) at a temperature of minus 109 degrees F. This low temperature did not affect the integrity of the bag 312 on cracking or brittleness. Therefore, the EarthPCB bag 312 could be used for cold storage for medical applications, such as shipping the COVID-19 vaccine and having the bag be biodegradable and biocompostable. An example formula for such bag is 88% plant-based polyethylene by weight, 8% of CaCO3 by weight, 2% PCR by weight, and 2% biodegradation additive by weight.

Figure 4A:
FIGS. 4A-C show the side, bottom and top views, respectively, of another product, a shoe sole, that was also successfully made from the earth plant-based compostable biodegradable composition disclosed herein.
Figure 4B:
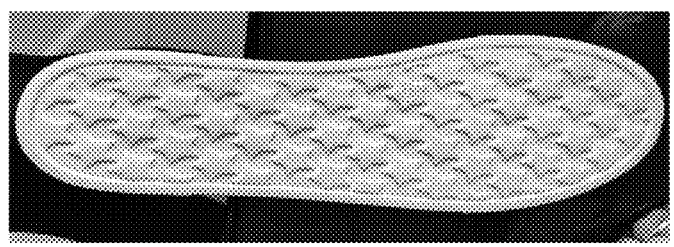
Figure 4C:
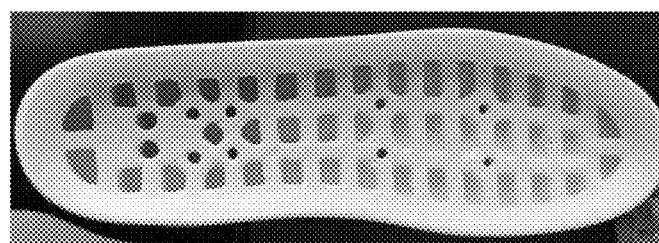

FIGS. 4A-C show the side, bottom and top views, respectively, of another product, a shoe sole, that was also successfully made from the earth plant-based compostable biodegradable composition disclosed herein. For example, a flexible EarthPCB plastic could be used for this application. EarthPCB has successfully been blend with Ethylene-Vinyl Acetate (EVA) to make a shoe sole that is biodegradable and compostable. Currently, old shoes are not recycled and go to landfills and they are toxic to our environment, taking up to 1000 years to break down into micro plastics, which are harmful to our environment and human health.

The following are some example of compositions that can be used for shoe soles, all ratios being by weight.

A composition for production of a bioplastic for shoes or other soft material applications that is compostable and biodegradable, the composition comprising a range of 30% to 60% plant-based polyethylene, 30% to 75% EVA—Ethylene-Vinyl Acetate, 4% to 20% CaCo3, 1% to 20% starch, 1% to 4% biodegradation additive, all ratios being by weight.

A composition for production of a bioplastic for shoes or other soft material applications that is compostable and biodegradable, the composition comprising a range of 28% to 60% plant-based polyethylene, 30% to 75% Bio-EVA—bio-based Ethylene-Vinyl Acetate, 1% to 25% CaCo3, 1% to 20% starch, 1% to 4% biodegradation additive, all ratios being by weight.

A composition for production of a bioplastic for shoes or other soft material applications that is compostable and biodegradable, the composition comprising a range of 22% to 60% plant-based polyethylene or 22% to 60% plant-based polypropylene, 10% to 50% EVA, 30% to 75% bio-EVA—bio-based Ethylene-Vinyl Acetate, 1% to 25% CaCo3, 1% to 20% starch, 1% to 4% biodegradation additive, 1% to 30% hemp, 1% to 25% cotton waste, 1% to 20% protein from plants, all ratios being by weight.

Figure 5:
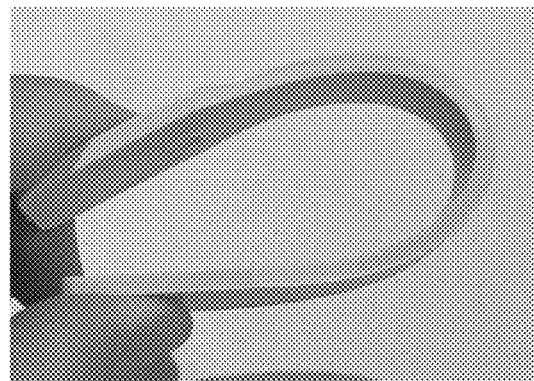
FIG. 5 shows a product made from the earth plant-based compostable biodegradable composition being flexible.

FIG. 5 shows an exemplary product (a living hinge) made from the earth plant-based compostable biodegradable composition being flexible. An EarthPCB living hinge can be used in flip top bottles for lotions, hand sanitizer or pill bottles, whereas, PLA, PHA, PHB and other biodegradable material cannot be used to make a flip top or living hinge products. An example of EarthPCB formula for this type of applications is 52% plant-based polyethylene by weight, 28% Bio-EVA (Ethylene vinyl acetate) by weight, 12% of CaCO3 by weight, 4% starch by weight, and 4% biodegradation additive by weight. The EarthPCB formula for this type of applications may also comprise petroleum material, such as polypropylene or PCR polypropylene. The EarthPCB composition will thus allow the petroleum materials to also be compostable biodegradable while being flexible to create a (a living hinge) which could be used in flip-top bottles for lotions, hand sanitizers, pill bottles or hand wipe packaging. An example of EarthPCB formula for this type of application is 80% PP-Polypropylene, 10% plant-based polyethylene, 6% CaCo3, 4% biography additive, all ratios being by weight.

It should be noted that, in general, for applications where the plastic should be more rigid, increasing the ratio of CaCO3 in the formula is a way to achieve that. On the other hand, for applications where the plastic should be more flexible, decreasing the ratio of CaCO3 and/or increasing the ratio of plant-based polyethylene in the formula may achieve that. Also, it should be noted that plant-based LLDPE is more flexible and thus should be used more in flexible plastic applications, than plant-based HDPE, which is more rigid.

Figure 6:
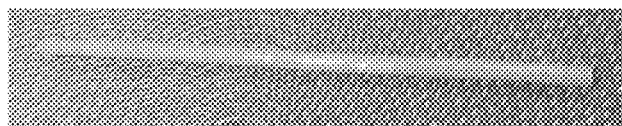
FIG. 6 illustrate a drinking straw made from the earth plant-based compostable biodegradable composition, that remained undeformed after being tested in boiling hot microwaved water.
Figure 7:
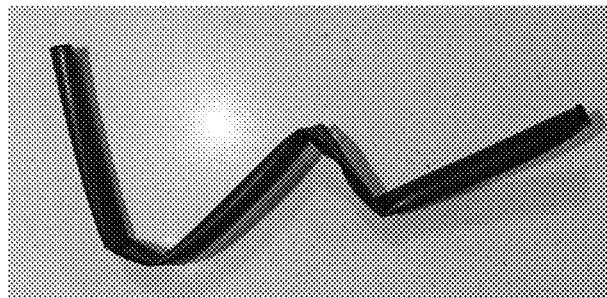
FIG. 7 illustrate a drinking straw made from PLA, that was deformed by boiling hot microwaved water.

FIG. 6 illustrate a drinking straw made from the earth plant-based compostable biodegradable composition, that remained undeformed after being tested in boiling hot microwaved water. FIG. 7 illustrate a drinking straw made from PLA, that was deformed when tested in the same test conditions, i.e., insertion in a cup filled with boiling hot microwaved water (about 212° F.). As shown, while the PLA straw lost its form and could not be used, the EarthPCB™ straw (FIG. 6) kept its form and could be used. This test also demonstrate that PLA could not be used for hot drinks or hot drink lids or stirrers as they could lose shape cause the hot water or liquid to spill out and badly burn or scalding the users' flesh hand, fingers or other body parts.

Figure 8:
FIG. 8 illustrate a mask made from the earth plant-based compostable biodegradable composition.

FIG. 8 illustrate a mask made from the earth plant-based compostable biodegradable composition. For example, a flexible EarthPCB plastic could be used for this application for better comfort to the user, and also a glowing EarthPCB plastic, like the one in FIG. 9, could be used. A glowing mask would for example make it easier to spot a firefighter wearing the mask in a dark environment.

Figure 9:
FIG. 9 illustrate a cup made from the earth plant-based compostable biodegradable composition that glows in the dark.

FIG. 9 illustrate a cup made from the earth plant-based compostable biodegradable composition that glows in the dark. A composition for production of a bioplastic for product that would be glowing in the dark that could be used in first responders masks, pill bottles, so a patient could easily find the medication in the dark, wall switch plates, as examples of the applications, could be made from earth plant-based compostable biodegradable composition of EarthPCB formula for this type of application is for example 30% to 80% plant-based polyethylene by weight, 20% to 60% Bio EVA (Ethylene-Vinyl Acetate) by weight, 1% to 20% CaCO3 by weight, 1% to 20% starch by weight, 10% to 30% glow additive by weight (e.g., Glowzone™), and 1% to 4% biodegradation additive by weight. Another example of EarthPCB formula for this type of application is 30% to 80% PP-polypropylene by weight, 20% to 60% Bio EVA (Ethylene-Vinyl Acetate) by weight, 1% to 20% CaCO3 by weight, 1% to 20% starch by weight, 10% to 30% glow additive by weight, and 1% to 4% biodegradation additive by weight.

Figure 10:
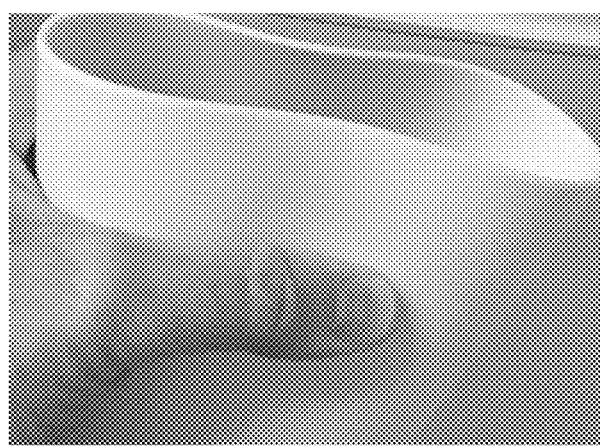
FIG. 10 illustrate a cup made from the earth plant-based compostable biodegradable composition that is still flexible after being cooled to freezing temperature.
Figure 11B:
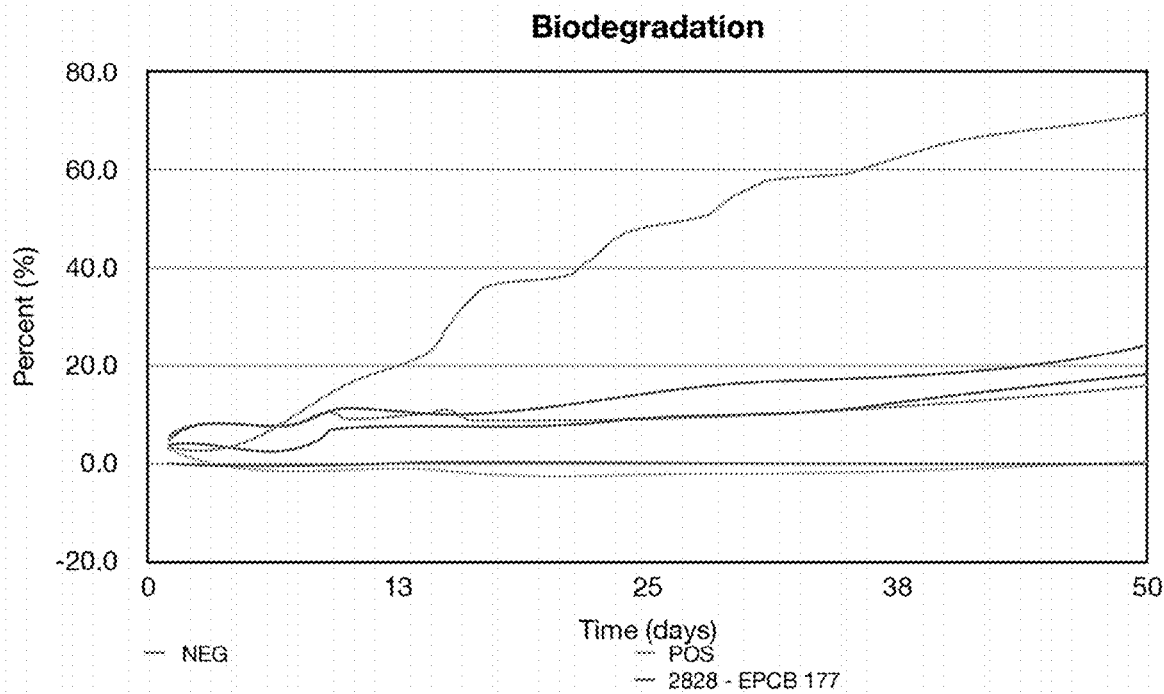
Figure 11C:
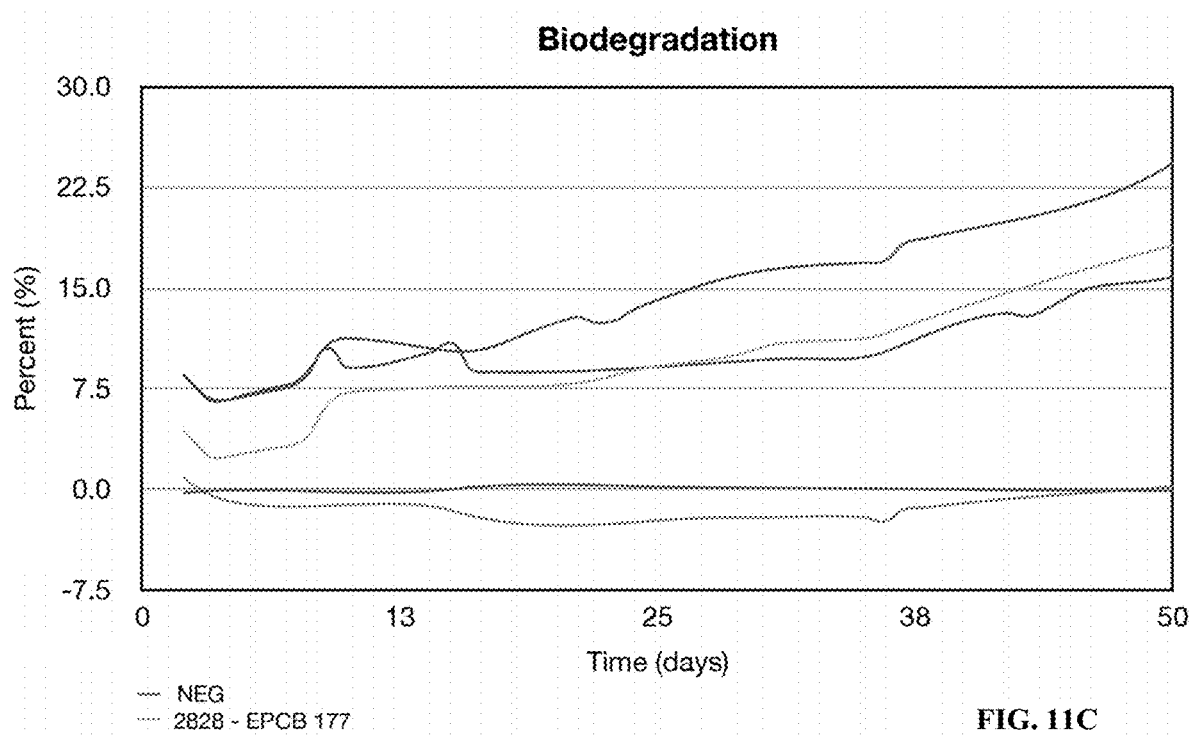
Figure 12B:
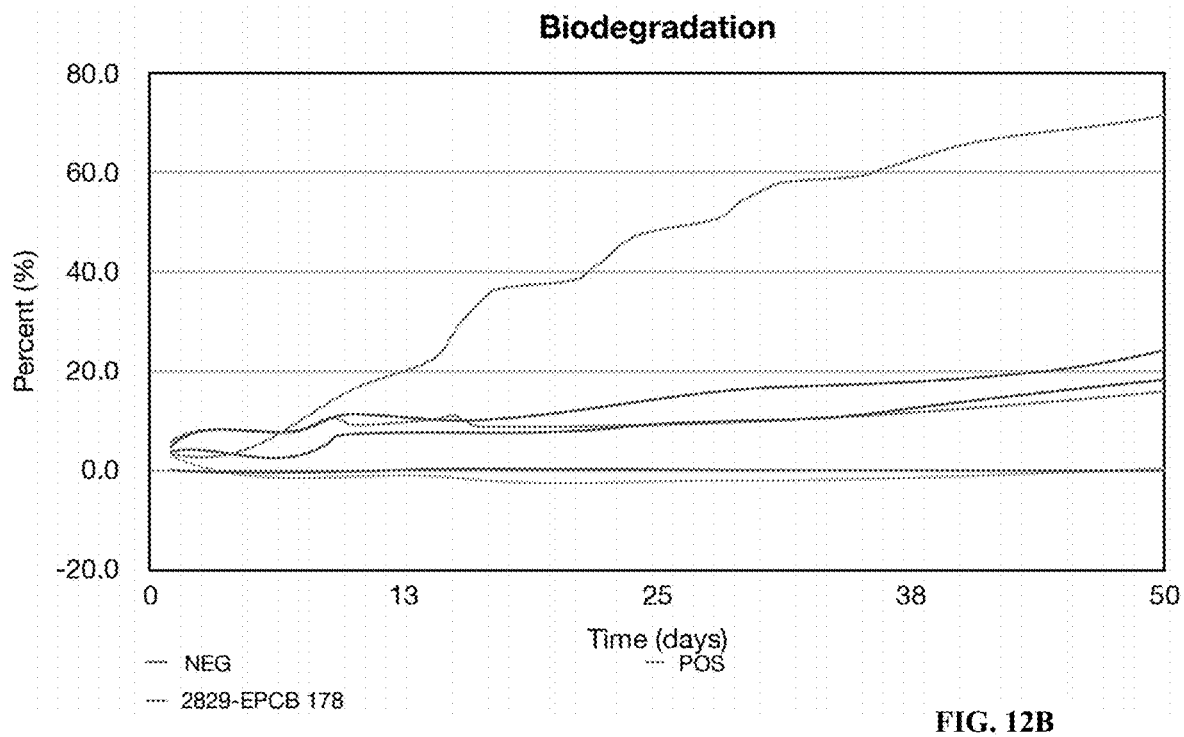
Figure 12C:
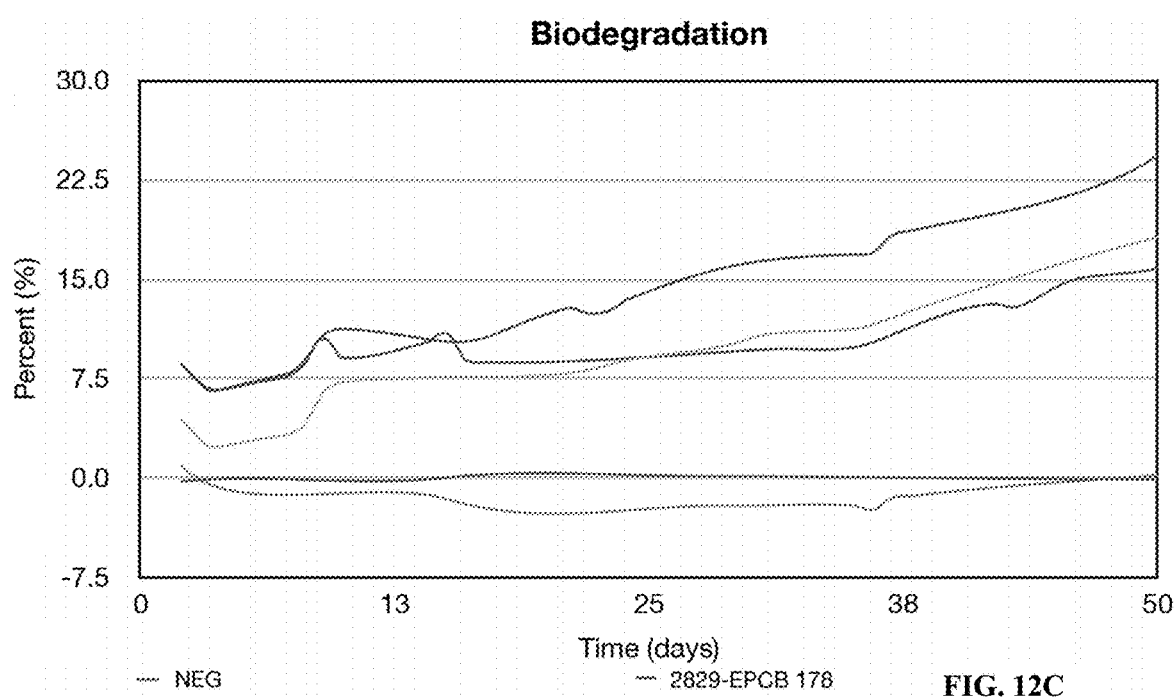

FIG. 10 illustrate a cup made from the earth plant-based compostable biodegradable composition that is still flexible after being cooled to freezing temperature (below 32° F.). Thus the composition is suitable for making ice cube trays, for example, while this cannot be done with PLA or PHA or PHB. Like with other flexible plastic applications, increasing the ratio of plant-based polyethylene and/or decreasing the ratio of CaCO3 makes that possible.

FIGS. 11A-C, 12A-C, 13A-C show results of biodegradation testing performed on plastic made from three particular formulas of the earth plant-based compostable biodegradable composition, EPCB 177, EPCB 178, EPCB 179, respectively. The EPCB 177 consists of Green PE 55%, $CaCO^3$ 25%, potato starch 10%, tapioca starch 7%, biodegradation additive 3%, all ratios being by weight. The EPCB 178 consists of Green PE 60%, CaCO$^3$ 25%, potato starch 11%, biodegradation additive 4%, all ratios being by weight. The EPCB 179 consists of Green PE 65%, CaCO$^3$ 25%, potato starch 6%, biodegradation additive 4%, all ratios being by weight.

The tests, the results of which are shown in FIGS. 11A-C, 12A-C, 13A-C, were performed according to ASTM D5511 and ASTM D5338.

In FIGS. 11A-C, 12A-C, 13A-C, the 'negative' column is a control sample, i.e., normal polyethylene. The 'positive' column is a sample of cellulose used to show the test is working. This is an organic material. The column to the right of the positive column is the sample of EarthPCB tested.

Figure 13B:
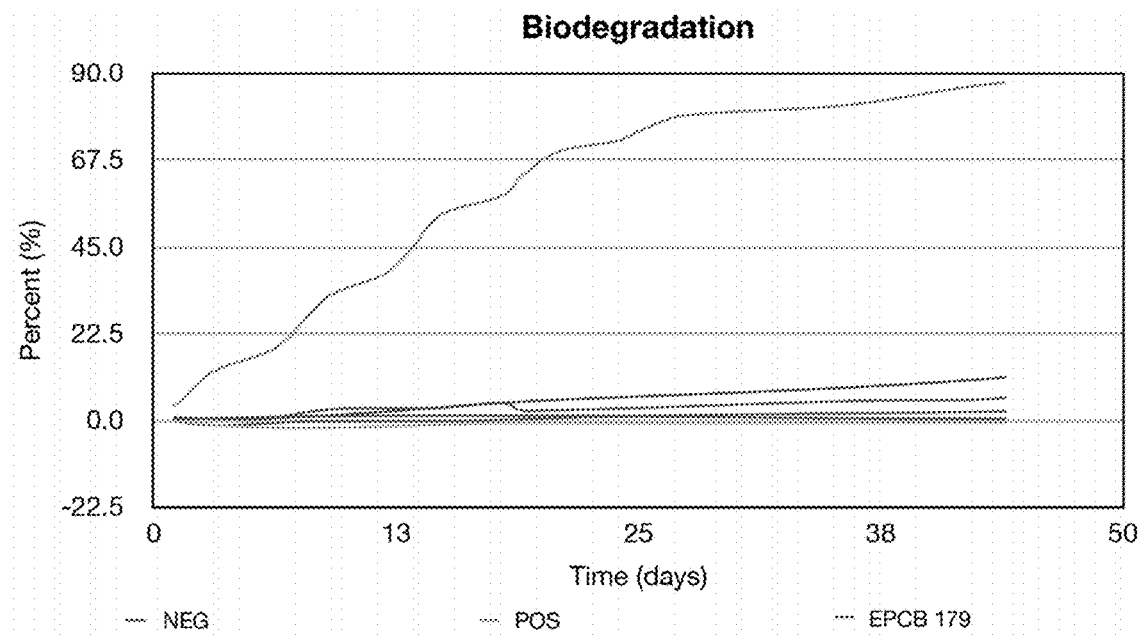
Figure 13C:
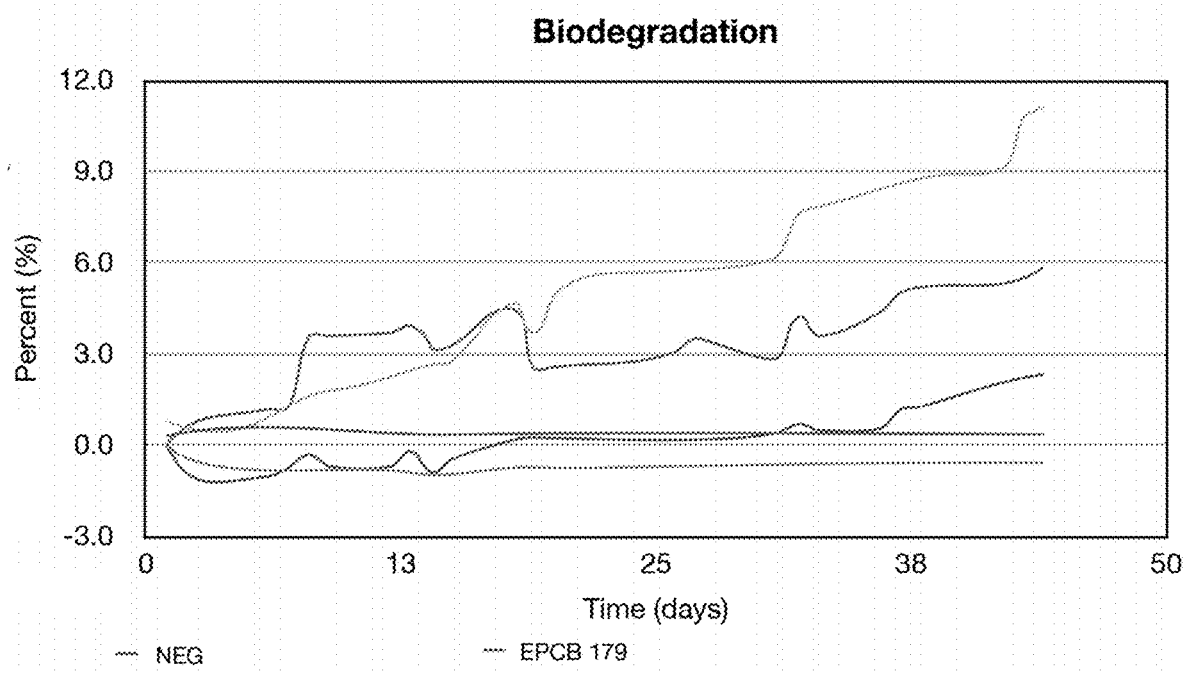

As it can be deducted from FIGS. 13A-C, the EarthPCB product tested (EPCB 179) showed the ASTM5511 biodegradation timeline of 2.6 years (100/(365/58×5.9)), which is less than 3 years, which was the testing goal on that EarthPCB composition blended formula. As shown, the EarthPCB product tested showed the ASTMD5338 bio compostable timeline of less than one year, which was the goal in a composting side for bioplastic. It should be noted that by changing the EarthPCB substrate composition blend formula the biodegradation and bio compostable timeline could become shorter, having the EarthPCB composition product to biodegrade faster.

FIG. 14A shows results of strength tests performed on plastic made from two particular formulas of the earth plant-based compostable biodegradable composition, EPCB 240, EPCB 241, respectively. The EPCB 240 consists of Green PE 90%, CaCO$^3$ 8%, biodegradation additive 2%, all ratios being by weight. The EPCB 241 consists of Green PE 95%, CaCO$^3$ 3%, biodegradation additive 2%, all ratios being by weight. FIG. 14B shows results of strength tests performed on plastic made from plant-based polyethylene versus petroleum-based polyethylene. As shown in FIGS. 14A-B, the strength properties of the two EPCB formulas tested are comparable or superior to those of plant-based polyethylene and petroleum-based polyethylene.

In an example, the disclosed EarthPCB composition may contain plant-based polyethylene (e.g., I'm Green™ polyethylene, Green PE) from approximately fifteen percent to ninety-nine percent (15-99%) by weight which is not biodegradable on its own. The composition may also include calcium carbonate (CaCo3) from approximately half of a percent to sixty percent (0.5-60%) by weight. The composition may also include food-based starches having no plasticizers added. The food-based starches are 100% biodegradable, compostable and recyclable, and may be provided from a half of a percent up to eighty-five percent (0.5-85%) by weight. The composition may also include food-based proteins (such as soy protein) which are 100% biodegradable on their own and may be provided from one half percent up to eighty-five percent (0.5-85%) by weight. The EarthPCB™ composition may also include a biodegradation additive (e.g., Bio Sphere™, or EcoPure™ or other biodegradation additives such as Earth Plus™) from approximately half of a percent up to ten percent (0.5-10%) by weight. Advantages of this EarthPCB™ resin are that resulting products are as strong or stronger than petroleum-based plastics, while also being compostable, biodegradable, recyclable and non-toxic to the environment.

The food starches may be derived from, for example, potato, tapioca, cassava, pea, corn, wheat and other food-based starches.

In another aspect, an earth plant-based compostable biodegradable composition is provided, wherein the composition may include soy protein, soy polyols, or soy plastic provided from approximately a half of a percent to thirty percent (0.5-30%) by weight. The EarthPCB™ resin may be provided with potato, tapioca, corn, cassava, pea, wheat or other food starches, with the soy protein, or other proteins in substitution of hemp hurd, resulting in a composition comprising ethanol-based Green polyethylene, calcium carbonate, soy protein, other proteins, biodegradation additive (e.g., Bio Sphere™, or EcoPure™ or other biodegradation additives such as Earth Plus™) and natural food starch. In this example, the composition thus has no thermoplastic starches or plasticizers.

Thus, an advantage of the EarthPCB™ composition with the substituted proteins and starch, natural food based materials, is that no chemicals of thermoplastic plasticizers or flexibilizers are added, that the resulting products are natural, are as strong or stronger than petroleum plastic, yet they are compostable, biodegradable, recyclable and non-toxic to the environment. Thus, they are also marine biodegradable.

An additional advantage may be that the components that make up the EarthPCB composition are widely available and cost-effective, economically feasible, rendering the resin an affordable and renewable alternative to petroleum-based plastic resins.

In another aspect, a method of making an earth plant-based compostable biodegradable composition is provided. Again, the EarthPCB composition may comprise an ethanol-based PE, which could be derived from corn, sugar, sugar beets and so on. Cellulosic biomass is the structural portion of plants, including complex sugars, that cannot directly be used for food ingredients or fermentation substrates, such as corn stocks, wheat fibers. The composition may also comprise calcium carbonate, hemp hurd, food starches, such as corn, potato, tapioca and other like natural food starches, proteins, such as soy protein or pea protein, biodegradation additive and bio polymers (PE, PP, etc.).

All of these different material compounded together face mixing challenges because some are powders and others small pellets. Ethanol-based PE or PP is generally in a pellets form, whereas food starches or proteins are generally a powder, while calcium carbonate is a small granular powder with granules of about 2 (two) microns in size. Mixing those different materials together is challenging.

In an example, the method of producing the earth plant-based compostable biodegradable composition disclosed herein may involve first milling the substrate copolymers into a fine powder, wherein each particle of the powder is approximately of the diameter 0.1 to 4.0 micrometers (microns). The ethanol-based Green polyethylene or Green polypropylene may be milled to a fine powder of about 0.1 to 4.0 microns, and the substrate calcium carbonate may be milled to a fine powder of about 0.1 to 4.0 microns, and the two powders may be mechanically mixed together, forming a first mixture before a next compound step and before heat is added.

Next, the substrate hemp hurd may be milled to a fine powder of about 0.1 to 4.0 microns and mechanically mixed, and blended dry with the first mixture, without heat, forming a second mixture. No heat had been applied yet in the compounding first two pre-steps of mixing the EarthPCB different materials.

Next, the substrate natural food starches may be milled to a fine granulated powder of about 0.1 to 4.0 microns and mechanically mixed and blended dry without heat with the second mixture. When two or more natural food starches are used, such as potato and tapioca starches, they are milled then mixed together first creating an uniformed natural food starch blend, then added to the second mixture, forming a third mixture.

Then, the substrate protein or proteins may be milled to a fine granulated powder of about 0.1 to 4.0 microns and mechanically mixed and blended dry without heat with the third mixture. When two or more natural food proteins are used, such as soy protein and pea protein, the proteins are milled then mixed together first, creating a uniformed natural food protein blend, then added to the main mixture with the third mixture, forming a fourth mixture.

After many tests, it was determine that the 0.1 to 4.0 microns particles size is critical to the proper blending of the compositions, and thus to their properties, as described herein (see FIG. 2 in contrast with FIGS. 1A-B).

Then the substrate biodegradation additive may be milled and blended dry without heat with the fourth mixture, forming the final EarthPCB composition. The biopolymer master batch may be blended together in a mechanical mixing and may be heated to between about 220 and 430 degrees Fahrenheit (F) (e.g., for a few minutes) to achieve thermodynamic activation of a master batch biopolymer, that is a compostable and biodegradable composition, and that can be used to make bioplastic products.

Thus, there are several economic advantages of the method of producing the EarthPCB substrate described above. All components of the resin blend evenly, no pre-dry with heat is needed to remove moisture from the plant based organic substrate biopolymer and the components are blended dry without the need of applying heat during the mixing process. An additional advantage of the method of producing the EarthPCB substrate may be that the manufacturing process requires relatively lower energy consumption because no pre-drying is needed, whereas other materials that are organic in nature, like PLA and PHA-PHB require extensive pre-heat drying before compounding or other processing, such as injection molding, extrusion molding or extrusion blow molding.

EarthPCB does not require heat drying of the premaster batch materials, as well the final master batch EarthPCB substrate does not have to be heat dried before use. The master batch is suitable for injection molding, extrusion molding or extrusion blow molding methods, to make bioplastic products.

In another aspect, a method of producing an earth plant based compostable biodegradable substrate resin in pelletized form is provided. The method of producing the EarthPCB substrate copolymer may include providing ethanol-based polyethylene or ethanol based polypropylene, made from corn, sugar or cellulosic organic materials for example, from, for example, approximately 25 to 99% by weight, with 1% to 10% by weight of a blended mixture of a natural food starch, calcium carbonate, and a biodegradation additive, mixed together in a powder form would create a compostable biodegradable composition biopolymer master batch resin that would not need to be pre-dried before injection molding, extrusion molding or extrusion blow molding takes place.

In another aspect, a method of producing an earth plant based compostable biodegradable substrate resin in pelletized form is provided. The method of producing the EarthPCB substrate copolymer may include mixing ethanol-based polyethylene or polypropylene from about 25 to 99% by weight, natural food starch from about 1 to 50% by weight, biodegradation additive from about 0.5 to 10% by weight, calcium carbonate from about 1 to 40% by weight, protein from about 1 to 40% by weight, wood fibers or grass fibers from about 1 to 40% by weight, and hemp hurd from about 1 to 50% by weight.

The method of producing the EarthPCB substrate copolymer may include first mill grinding each substrate copolymer separately into fine powders of about 0.1 to 4.0 microns. Those fine powders may then be blended uniformly in a mechanical mixer for about 5 to 25 minutes for each powder, adding each substrate copolymer one at a time during the mixing process. The fine powders are blended dry with no heat in the mechanical mixer. When all of the substrate copolymers have been mechanically agitated and mixed together dry and with no heat, then the complete master batch mixture of substrate may be heated at a temperature of between about 220 and 430 degrees F. to achieve thermodynamic activation, thus establishing cohesion between each substrate copolymer and resulting in a substrate master batch resin. Finally, the substrate resin may be cured at a temperature between about 220 and 430 degrees F. to form pelletized bioplastic that may then be used in various manufacturing processes for the production of bioplastic products.

Thus an advantage of the method of producing the substrate resin may be that the master batch resin is not temperature sensitive to cold in a freezer for example, or hot temperature in a microwave for example, or hot temperature in a lower rack of a dishwasher or sensitive to hot boiling water at 212 degrees F. while the master batch resin is also earth plant based compostable, biodegradable and recyclable, when no other plant based resin has achieved these cold to heat temperature resilience for a bioplastic durable goods. As discussed hereinbefore, PLA, PHB and PHA melts in heat and becomes brittle in cold temperatures, and are thus not durable. Thus, an advantage of the method of producing the substrate master batch resin may be that the resin can be used as a material to form numerous plastic products, such as food and beverage containers, packaging, film, plastic bags, automotive parts, medical devices, cosmetic packaging, household goods, electronic products, aircraft parts, toys and any other products that are made from petroleum plastic. An additional advantage of the method may be that the resulting products will be recyclable, compostable and biodegradable. Also, another advantage is that the master batch resin could be obtained from as little as two of the material components described above and still be compostable and biodegradable or could be obtained from all components disclosed herein, to make a master batch resin and still be compostable and biodegradable as well as recyclable.

The PE based EarthPCB composition disclosed herein can be recycled with other PE plastics, to become a PCR (Post-Consumer Recycled) resin.

The PP based EarthPCB can be recycled with other PP plastics to become PCR resin.

The above aspects, examples or advantages, as well as other aspects, examples or advantages, will become even more apparent from the ensuing description.

The EarthPCB composition may have additional advantageous properties, such as improved environmental temperature ranges that bioplastic materials could be used in, improved strength in comparison with other bioplastic materials, improved flexibility, moisture resistance, oxygen barrier property, coloring improvements of bioplastic materials, such as red, yellow, green, blue, orange and all other colors, biodegradation properties, and compostability. Further, the materials that form the EarthPCB are also widely available and relatively low-cost, making EarthPCB one of the most economically feasible bioplastic material in the world.

The pellets resin feed stock material segment/component may comprise an ethanol-based polyethylene, or ethanol-based polypropylene, a biodegradation additive (e.g., EcoPure, Bio Sphere or other type additives, such as Earth-Plus), calcium carbonate (CaCo3) in a 0.1 to 4.0 micron size, and the soft powder segments/components may comprise of natural food starch, natural protein, hemp hurd, or grass fibers, or wood chip milled into a fine powder 0.1 to 4.0 micron size. These segments may enable products made from the EarthPCB resin to compost and biodegrade after use, while also being non-toxic. Thus, an advantage may be that the earth plant based compostable biodegradable resin-based bioplastic can be used to replace petroleum-based plastics that are currently used in the market today. For example, this includes but is not limited to food and beverage packaging, cosmetic and healthcare products packaging, automotive, construction, textiles, bags-film, and in applications such as injection molding, extrusion blow molding extrusion molding, as well as in other types of customer and industrial products.

In an aspect, the EarthPCB composition may be provided with an ethanol-based polyethylene from approximately fifteen percent to ninety-nine (15-99%) by weight in a form of pellets or a preferred form of finely ground powder of about 0.1 to 4.0 micrometers (microns).

The EarthPCB resin substrate may also be provided with calcium carbonate (CaCo3) from approximately 0.25% by weight, EarthPCB resin substrate may also be provided with natural food starch such as potato or tapioca, or corn starch from approximately 0.25% by weight, and EarthPCB resin substrate may also be provided with a biodegradation additive from approximately 0.5% by weight, completing a 99% by weight of ethanol-based polyethylene and a 1% by weight of a combination of calcium carbonate (CaCo3), natural food starch, and a biodegradation additive. The advantage of this resin substrate as well is that it would be biodegradable, biocompostable and recyclable, as well as being economically feasible.

In another aspect, the EarthPCB composition may be provided with an ethanol based polyethylene from approximately fifteen percent to ninety-nine (15-99%) by weight in a form of pellets or a preferred form of finely milled powder of about 0.1 to 4.0 micrometers (microns). The EarthPCB resin substrate may also be provided with CaCo3 from approximately one percent by weight to fifty percent (1 to 50%) by weight of fine powder generally in the preferred approximate diameter 0.1-4.0 microns.

The presence of calcium carbonate in the EarthPCB may be advantageous for multiple reasons for particular applications where in white plastic is describable, such as in pill bottles, shampoo or lotion bottles, cosmetic packaging, food and beverage packaging, supplements packaging, such as protein or nutrition packaging, etc.

Because calcium carbonate is naturally white, it may decrease the need for white colorant, which may decrease the cost of producing the EarthPCB for such applications. An additional advantage is that the EarthPCB substrate formulation-composition uses lower concentrations of calcium carbonate that those of stone-based resin, which makes the EarthPCB composition less brittle.

Additional advantages are that the EarthPCB substrate composition concentration of calcium carbonate could speed up the biodegradation timeline, add strength, makes EarthPCB more temperature tolerant, is a natural material that goes back into the earth and is a sustainable earth material.

The EarthPCB resin substrate may also be provided with hemp hurd from approximately one to seventy-five percent (1-75%) by weight milled into a fine powder of about 0.1 to 4.0 microns, as an example. Using hemp hurd to produce plastic may be a better option than petroleum-based plastic as it is 100% biodegradable and recyclable. The EarthPCB resin substrate composition may also include natural food starch (NFS) in many different varieties being used at the same time in the substrate or just using one type of natural food starch such as potato or tapioca, or corn, which is derived from natural starch granules that occur in plants (e.g., potato, tapioca, wheat, corn, rice, cassava, pea and other such plants). The natural food starch may be provided from approximately 0.25 percent to sixty percent (0.25%-60%) by weight milled into a fine powder of about 0.1 to 4.0 microns particles.

The EarthPCB resin substrate may also be provided with food protein such as soy, pea, hemp seeds, beans and other plant-based protein from approximately one-half percent to fifty percent (0.5-50%) by weight milled into a fine powder of about 0.1 to 4.0 microns, as an example. Using plant-based proteins to produce plastic may be a far better option than petroleum-based plastic as it is 100% biodegradable and recyclable.

The EarthPCB resin substrate composition may also include natural grasses (there are 12,000 species of grass), like bamboo (there are as many as 12 different types of bamboo), corn stalk or other cellulosic biomass. An advantage of using grass in the substrate composition is that this material is plentiful all over the world and is a low-cost-material to be used to make plastics, it is also 100% biodegradable. Also, wood chips or charred wood could be used in the substrate composition The amount of wood or other cellulosic material may be from approximately one percent to 35 percent (1-35%) by weight, milled into a fine powder of about 0.1- to 4.0 microns, as an example.

The same substrate composition of grasses percent could be used and milled into a fine powder in the same micro size range grass from approximately one percent to 35 (1-35%) by weight milled into a fine powder all about 0.1 to 4.0 microns, as an example. An advantage of these substrate compositions is that they are 100% biodegradable and recyclable.

Lastly, EarthPCB resin may be provided with biodegradable additive in approximately one-half percentage to ten percent (0.5-10%) by weight in a pellet form or a preferred form milled into a fine powder of about 0.1 to 4.0 microns, as an example. The biodegradation additive enables the products formed with the EarthPCB composition to biodegrade or bio compost within 2 months to 3 years depending upon the EarthPCB composition blend and the end of life environment the products made from EarthPCB end up in.

Thus, an advantage of the EarthPCB composition may be that bioplastic products made from the composition are as strong or stronger than petroleum plastic, yet they are compostable, biodegradable, recyclable and non-toxic to the environment.

It should be understood that within the ranges described above, various EarthPCB compositions can be formulated of the multiple components described. Tests revealed however that four of the multiple components are critical to obtaining a suitable, durable, biodegradable and biocompostable EarthPCB resin.

Those four (4) components are the ethanol-based polyethylene or polypropylene, natural food starch (without plasticizer or thermoplastic starch in them), calcium carbonate (CaCo3) and a biodegradation additive. In an example, one may choose to combine 60% by weight Green polyethylene with 20% by weight calcium carbonate, with 18% by weight natural food starch and with 2% by weight biodegradation additive.

In another example, one may choose to combine five of the above components into a single composition, by ensuring the radio by each components falls within the range described above for each component and that the total of the ratio equals 100%, for example as follows: 50% Green polyethylene or Green polypropylene by weight, 15% calcium carbonate by weight, 15% potato starch, 10% tapioca starch, 6% hemp hurd by weight, 4% biodegradation additive by weight.

In another example, three (3) components could be used. For example, 90% Green polyethylene or Green polypropylene by weight, 7% calcium carbonate by weight, and 3% biodegradation additive by weight. Another example of three-component EarthPCB could be 90% Green polyethylene or Green polypropylene by weight, 9% calcium carbonate by weight, and 1% biodegradation additive by weight.

In another aspect, the EarthPCB composition may be provided with a variation of a component in the same composition. An example could be 55% Green polyethylene or Green polypropylene by weight, 10% calcium carbonate by weight, 7% potato starch by weight, 7% tapioca starch by weight, 2% soy protein by weight, 2% pea protein by weight, 2% hemp hurd by weight, 5% bamboo fibers by weight and 3% biodegradation additive by weight. The components of protein, starch and grass would be milled into a fine powder of about 0.1 to 4.0 microns in diameter.

In another aspect, the EarthPCB composition may be provided with soy protein as a substitute for hemp hurd raw material, or bamboo grass fibers could be used as a substitute for the hemp hurd raw material. The EarthPCB composition with the substituted soy protein or bamboo fiber grass may thus comprise the soy protein or bamboo grass from approximately one to thirty percent (1-30%) by weight milled into a fine powder of about 0.1 to 4.0 microns in diameter, or as the same percentage by weight as shown above. The remaining components (e.g., starch, calcium carbonate, Green polyethylene) may be provided in the same amounts by weight and of the same particle sizes as described previously above in pellet or powder form.

The EarthPCB resin described above may be produced from the following preferred formulas. A first exemplary formula of the EarthPCB composition may comprise 63% Green polyethylene by weight, 14% calcium carbonate by weight, 10% potato starch by weight, 10% tapioca starch by weight, 3% biodegradation additive by weight.

In another exemplary formula, the EarthPCB composition comprise 67% Green polyethylene by weight, 24% calcium carbonate by weight, 8% food starch by weight and, 1% biodegradation additive by weight.

In another exemplary formula, the EarthPCB composition may comprise 99% Green polyethylene by weight, 0.25% calcium carbonate by weight, 0.25% food starch by weight, and 0.5% biodegradation additive by weight.

In another exemplary formula, the EarthPCB composition may comprise 62% Green polyethylene by weight, 2% food protein by weight, 17% calcium carbonate by weight, 18% food starch by weight and 1% biodegradation additive by weight.

In another example of the formula, the EarthPCB composition may comprise 65% Green polyethylene by weight, 19% calcium carbonate by weight, 13% food starch, and 3% biodegradation additive by weight.

In another exemplary formula, the EarthPCB composition may comprise 62% Green polyethylene by weight, 25% calcium carbonate by weight, 12% food starch by weight, and 1% biodegradation additive by weight.

In another exemplary formula, the EarthPCB composition may comprise 50% Green polyethylene by weight, 24% calcium carbonate by weight, 12% potato starch by weight, 12% of tapioca starch by weight, and 2% biodegradation additive by weight.

In another exemplary formula, the EarthPCB composition may comprise 60% Green polyethylene by weight, 17% calcium carbonate by weight, 10% potato starch by weight, 10% of tapioca starch by weight, and 3% biodegradation additive by weight.

In another exemplary formula, the EarthPCB composition may comprise 70% Green polyethylene by weight, 15% calcium carbonate by weight, 6% potato starch by weight, 6% of tapioca starch by weight, and 3% biodegradation additive by weight.

In another exemplary formula, the EarthPCB composition may comprise 80% Green polyethylene by weight, 9% calcium carbonate by weight, 4% potato starch by weight, 4% of tapioca starch by weight, and 3% biodegradation additive by weight.

In another exemplary formula, the EarthPCB composition may comprise 90% Green polyethylene by weight, 5% calcium carbonate by weight, 1% potato starch by weight, 1% of tapioca starch by weight, and 3% biodegradation additive by weight.

In another exemplary formula, the EarthPCB composition may comprise 62% Green polyethylene by weight, 14% calcium carbonate by weight, 10% potato starch by weight, 10% of tapioca starch by weight, and 1% biodegradation additive by weight, and 2% color additive that is FDA approved for food contact. As an example, a construction worker's hard hat could be colored yellow so that heavy equipment operators on a construction site or a factory floor could easily see the worker wearing a yellow hardhat. This is an advantage of the EarthPCB composition with the substrate composition of color additive that is FDA compliant or is biodegradable may be that the worker wearing the yellow hardhat would be easily seen and the hard hat made with EarthPCB resin is a strong or stronger than petroleum plastic and are compostable, biodegradable, recyclable and non-toxic to the environment.

In another exemplary formula, the EarthPCB composition may comprise of 1 to 10% color additive by weight whereas the color additive is FDA compliant food contact where different color EarthPCB food and beverage containers could be used to identify certain brands, food or beverage, content of the container (e.g., may be identifying a gluten free food or a diet beverage). For example, blue color could mean diet, whereas a red container could mean the beverage contains sugar, and a gluten free food color packaging could be a gold color.

In another exemplary formula, the EarthPCB composition may comprise 90% Green polyethylene by weight, 6% calcium carbonate my weight, 2% biodegradation additive by weight, 2% of color additive by weight.

In another exemplary formula, the EarthPCB composition may comprise 95% Green polyethylene by weight, 1% calcium carbonate my weight, 1% biodegradation additive by weight, 3% of color additive by weight.

In another exemplary formula, the EarthPCB composition may comprise 99% Green polyethylene by weight and 1% biodegradation additive by weight.

In another exemplary formula, the EarthPCB composition may comprise 51% Green polyethylene by weight, 22% calcium carbonate by weight, 22% food starch by weight, 2% color additive by weight, and 3% biodegradation additive by weight.

As shown by the above preferred composition formulas, at least two of the substrate materials would need to be used to achieve a resin that is biodegradable and compostable. These two substrate copolymers would be Green polyethylene from approximately 90 to 99 percent (90 to 99%) by weight, biodegradation additive from approximately 1 to 10 percent (1 to 10%) by weight.

However, as shown by the above preferred composition formulas of EarthPCB, at least four of the substrate materials would need to be used to achieve a resin that is biodegradable and compostable in a faster timeline, as well because the EarthPCB substrate materials like calcium carbonate, food starch, grasses, food protein, are less expensive by weight than Green polyethylene or Green polypropylene by weight and biodegradation additive by weight. There is a clear economic advantage to using at least three or four of the EarthPCB materials in the substrate composition formula.

Thus, an advantage of the EarthPCB composition disclosure herein may be that bioplastic products made from EarthPCB resin may be compostable, biodegradable and recyclable, even when using only two or three of the substrate copolymers.

In particular, the EarthPCB composition was compared in density to PLA (polylactic acid) and it was found that PLA has 1.24 g/cm$^3$ density, and EarthPCB had a density of around 0.95 g/cm$^3$, 29% less dense, meaning that EarthPCB could weigh 29% less in comparison to PLA for the same product produced. This is significant benefit in terms of freight costs and product handling. For example, a person lifting a box of products made of PLA would be lifting 50-pound box of products, whereas that same box of materials made of EarthPCB would weight 35.5 pounds. This would be also corresponding to a company being able to pack 29% more products by weight into a 50-pound package, which could be significant economic savings. Both PLA and EarthPCB are biodegradable and biocompostable, petroleum-based polyethylene may have a similar density factor as EarthPCB, however, (PE) polyethylene is not biodegradable nor biocompostable and can only be recycled. And global recycling rates are at 9% which is devastating to our environment. Thus, an advantage of the EarthPCB composition disclosed herein may be that bioplastic products made from EarthPCB resin weight less than PLA, are biodegradable, biocompostable, and recyclable, whereas petroleum-based polyethylene may have a similar density to EarthPCB, however, PE is not biodegradable or biocompostable; similarly, green polyethylene may have a similar density to EarthPCB, however, (Green PE)—green polyethylene is not biodegradable or biocompostable without the substrate composition of EarthPCB copolymers blended with Green PE. Therefore, there is a clear advantage of the EarthPCB, when it comes to the combination of weight/density, biodegradability and biocompostablility, over PLA, PE, and Green PE.

PCR: Post-Consumer Recycled Material Plastic

EarthPCB formulas were designed to complement a range of scenarios for responsibly disposing of plastic waste, including recycling and reducing (PCR-Post-Consumer Recycled Materials) into a circular economy.

Likewise, PCR: post-consumer recycled plastic, are plastic material that are reused, recycled and re-purposed—they become PCR: post-consumer recycled material, PCR is being used in various percentages by weight with resin petroleum plastic anywhere from 5% to 100% PCR to make new products. So, the more we recycle plastic waste the better it is for our environment.

For example, the cost of PCR is very high compared to similar resin regular plastic such as HDPE could cost $0.60 per pound whereas PCR-HDPE could cost as much as $1.30 per pound.

There are over 6 trillion kilograms of plastic waste in the world and every ounce of conventional plastic ever created is still with us. This influx of plastic waste is destructive to our environment and our health. Micro-plastics accumulate in humans, terrestrial, and aquatic food chains through our agricultural soil and water supply, causing a wide array of negative health impacts.

Those tiny pieces enter our unwitting bodies from tap water, food and even the air we breathe, many having chemicals linked to cancers, hormone disruption, and developmental delays.

In general, there has been no real sustainable end of life solution to the plastic waste problem. There has been on real sustainable-bioplastic material developed that can be economically scaled for mass production, that is economically feasible, and can be used to replace a wide range of petroleum based plastic products used today in the global market. We need a collect and destroy plan for plastic waste.

Therefore, there is a need to solve the problems described above by producing an economically feasible earth plant-based compostable and biodegradable composition, having eco-friendly properties that can be used in PCR-Post-Consumer Recycled resins, and scalable methods for manufacturing said compositions/resins globally.

In an aspect, an earth plant-based compostable biodegradable (EarthPCB™) composition is provided comprising a composition of blended earth materials and copolymer substrates. To solve the problem of PCR—products going back into landfills or our oceans after recycling and reuse, EarthPCB™ can incorporate one to ninety nine percent (1 to 99%) by weight of PCR resin such as polyethylene PE, polypropylene PP, as an example. The composition may also include one half percent to ten percent (0.5 to 10%) biodegradation additive by weight. PLA, PHA, PHB cannot be recycled with PCR or blended/compounded with PCR, but EarthPCB™ can be.

In another aspect, an earth resin-based "plus" compostable biodegradable composition resin may comprise an ethanol based Green Polyethylene—Green PE from approximately fifteen percent to ninety five percent (15 to 95%) by weight, five to fifty percent PCR—polyethylene or polypropylene (5 to 50) by weight, one percent to thirty percent calcium carbonate CaCo3 (1 to 30%) by weight, one percent to thirty percent food starch (1 to 30%) by weight, half percent to ten percent biodegradation additive (0.5 to 10%) by weight, food protein such as soy or pea protein one percent to thirty percent (1 to 30%) by weight, one percent to fifty percent hemp hurd or bamboo grass, or wood chips, (1 to 50%) by weight.

Blending mixing EarthPCB with plastic PCR resins would create a sustainable end of life for plastic waste and PCR plastic products, as well as create a safety net, that if the PCR plastic would happen to end up back into the ocean or a landfill, it would biodegrade, and not have to be costly recycled again. If this is not done, the vicious cycle of plastic waste going into our environment will continue to exist and get worse, since our global population moves toward 9 billion people.

It should be apparent that, when creating a particular EarthPCB composition from the weight percentage ranges of each component disclosed herein, the total by weight percentage of the particular composition should not exceed one hundred percent (100%).

The EarthPCB—plus PCR resin described above may be produced from the following exemplary formulas. A first exemplary formula of the EarthPCB composition may comprise of 5% PCR-Polyethylene, by weight, 60% Green Polyethylene by weight, 12% calcium carbonate by weight, 10% potato starch by weight, 10% tapioca starch by weight, 3% biodegradation additive by weight.

In another exemplary formula, the EarthPCB composition may comprise 10% PCR-Polyethylene resin by weight, 60% Green polyethylene by weight, 15% calcium carbonate by weight, 12% food starch by weight, 3% biodegradation additive by weight.

In another exemplary formula, the EarthPCB composition may comprise 15% PCR-Polyethylene resin by weight, 60% Green polyethylene by weight, 10% calcium carbonate by weight, 12% food starch by weight, 3% biodegradation additive by weight.

In another exemplary formula, the EarthPCB composition may comprise 25% PCR-Polyethylene resin by weight, 50% Green polyethylene by weight, 15% calcium carbonate by weight, 8% food starch by weight, 2% biodegradation additive by weight.

In another exemplary formula, the EarthPCB composition may comprise 50% PCR-Polyethylene resin by weight, 35% Green (plant-based) polyethylene by weight, 12% calcium carbonate by weight, 3% biodegradation additive by weight.

In another exemplary formula, the EarthPCB composition may comprise 75% PCR-Polyethylene resin by weight, 15% Green (plant-based) polyethylene by weight, 8% calcium carbonate by weight, 2% biodegradation additive by weight.

In another exemplary formula, the EarthPCB composition may comprise 99% PCR-Polyethylene resin by weight, 1% biodegradation additive by weight.

It should be known that a small percentage of color additive could be added to the formula to achieve a certain color as explained in another aspect. For example, 1 to 10% color additive could be added by correspondingly reducing any of the other component substrates such as PCR-PE, Green PE, calcium carbonate, cotton, food starch, biodegradation additive. It should be known that, as described hereinbefore, other EarthPCB substrates could be used, such as food protein, hemp hurd, bamboo, grasses, woods, biomass, cellulose, cotton, in addition to or as a substitute of other substrates. Again, all of these substrates are biodegradable.

In another exemplary formula, the EarthPCB composition may comprise 25% PCR-Polyethylene resin by weight, 50% Green polyethylene resin by weight, 10% calcium carbonate by weight, 5% cotton waste by weight, 7% food starch by weight, 3% biodegradation additive.

In another exemplary formula, the EarthPCB composition may comprise 5% PCR-polypropylene resin by weight, 60% Green polypropylene resin by weight, (again, Green polypropylene is made from ethanol), 12% calcium carbonate by weight, 10% potato starch by weight, 10% tapioca starch by weight, 3% biodegradation additive.

In another exemplary formula, the EarthPCB composition may comprise 10% PCR-Polyethylene resin by weight, 60% Green polypropylene by weight, 15% calcium carbonate by weight, 12% food starch by weight, 3% biodegradation additive.

In another exemplary formula, the EarthPCB composition may comprise 15% PCR-polypropylene resin by weight, 60% Green polypropylene resin by weight, 10% calcium carbonate by weight, 12% food starch by weight, 3% biodegradation additive.

In another exemplary formula, the EarthPCB composition may comprise 50% PCR-Polypropylene resin by weight, 35% Green polypropylene by weight, 12% calcium carbonate by weight, 3% biodegradation additive by weight.

In another exemplary formula, the EarthPCB composition may comprise 75% PCR-Polypropylene resin by weight, 15% Green polypropylene by weight, 8% calcium carbonate by weight, 2% biodegradation additive by weight.

In another exemplary formula, the EarthPCB composition may comprise 99% PCR-Polypropylene resin by weight, 1% biodegradation additive by weight.

Again, a small percentage of color additive could be added to the formula to achieve a certain color as explained in another aspect. For example, 1 to 10% color additive could be added by correspondingly reducing any of the other component substrates, such as PCR-PP, Green PP, calcium carbonate, food starch, cotton, biodegradation additive.

Again, other EarthPCB substrates could be used, such as food protein, hemp hurd, bamboo, grasses, woods, biomass, cellulose, cotton could be added or substituted. All of these substrates are biodegradable.

In another composition may comprise 25% PCR-Polypropylene resin by weight, 50% Green polypropylene by weight, 10% calcium carbonate by weight, 5% cotton waste by weight, 7% food starch by weight, 3% biodegradation additive by weight.

The PCR resins could also be milled to a fine granulated powder of about 0.1 to 4.0 microns and mechanically mixed, and blended dry without heat with the other substrates in the EarthPCB formulas.

In another example, an earth plant-based compostable biodegradable (EarthPCB) composition is provided comprising a composition of blended earth and copolymer substrates. The composition may be provided with ethanol-based Green Polypropylene made from different type of organic materials such as corn, sugarcane, sugar beets, cellulosic, or other plant-based ethanol Earth polypropylene or Green polypropylene (e.g., EarthPCB™, Earth-based polypropylene, I'm Green or I'm EarthPP polypropylene EarthPP or Green PP) from approximately fifteen percent to ninety-nine percent (15-99%) by weight which are not biodegradable on their own. The composition may also include calcium carbonate (CaCO3) from approximately half of a percent to sixty percent (0.5-60%) by weight. The composition may also include food-based starches which are 100% biodegradable, compostable and recyclable, and may be provided from a half of a percent up to eighty-five percent (0.5-85%) by weight. The composition may also include food-based protein which are 100% biodegradable on its own and may be provided from one half percent up to eighty-five percent (0.5-85%) by weight. The EarthPCB resin may also include a biodegradation additive from approximately half of a percent up to ten percent (0.5-10%) by weight. Thus, and advantage of the EarthPCB substrate may be that resulting products are as strong or stronger than petroleum-based plastics, while also being compostable, biodegradable, recyclable and non-toxic to the environment.

Again, the food starches may also include but not be limited to potato, tapioca, cassava, pea, corn, wheat, and other food-based starches.

Thus, it should be apparent that, due to the biodegradable nature of the compositions disclosed herein, if any recycling system fails, if there are leaks into the environment because of unmanaged waste, there is finally a solution—EarthPCB.

As will we discussed in the further detail herein below, during testing it was discovered that the mill grinding of each of the components before mixing the resin allows each component to blend uniformly.

In an aspect, a method of producing EarthPCB composition is provided the method of producing EarthPCB resin substrate may first involve mill grinding each copolymer separately into a fine powder, wherein each particle is about 0.1 to 4.0 microns in diameter. The substrate copolymers may be Green polyethylene or Green polypropylene, calcium carbonate (CaCo3), grass, cotton waste, wood, such as bamboo, hemp hurd, burned wood chips, or sawdust wood fibers, food protein, such as soy protein, food starch, such as potato, tapioca, corn starches, biodegradation additive, as an example, and may be provided in a solid state. The above substrate components may be in pellet form, but the preferred form would be a fine milled powder. Pre-selected amounts of each substrate copolymer may be measured out for producing EarthPCB composition.

The substrate copolymers may be ground, milled or pulverized into the diameter range to enable a fine, powdered fine, powdered blending of each of the copolymers into a uniform composition. The particle size of the powered copolymers may be measured via geometric methods, such as microscopy or sieving. In a preferred exemplary embodiment, Green PE, Green PP, grasses, woods, cotton, CaCo3, food starches, food protein meals, biodegradation additive may be milled into a fine powder about 0.1 to 4.0 microns in diameter. Hemp hurd fibers, which form the inner core of the hemp stalk, are generally woody and therefore do not compound well or blend evenly on their own. Thus, when the hemp hurd is ground to a fine powder of about 0.1 to 4.0 microns in diameter, it blends and compounds more uniformly with the other substrate copolymers. The same holds true for grasses, wood fibers, wood chips, cotton, biomass and therefore they do not compound well or blend evenly on their own. Thus, when these substrate components are ground to a fine powder of about 0.1 to 4.0 microns in diameter they blend and compound more uniformly with the other substrate copolymers. Thus, an advantage of milling these substrate components into this fine powder size may be that the EarthPCB resin is stronger, more flexible, and economically feasible because no pre-drying is needed before compounding. These components are compostable, biodegradable and recyclable.

Once each of the substrate copolymers are blended generally in the range of about 0.1 to 4.0 microns, copolymers may be blended together and mechanically mixed with no heat or pre-drying. As an example, each component may be added one at a time to the mix in a mechanical mechanism, wherein the mixture is mixed for about 5 to 25 minutes at the time before the next substrate copolymer is added. Once all of the substrate copolymers have been mechanically agitated together and dry, with no heat or pre-drying the substrate components to remove the moisture out of the organic substrate before compounding takes place (the components mixed together help to dry up the moisture), the resulting mixture may be heated in the compounding method to a temperature between about 220 and 430 degrees Fahrenheit (F). The heating of the final mixture of substrate achieves thermodynamic activation within the mixture, such that cohesion is established between each substrate copolymer of the mixture without using a thermoplastic starch or a plasticizer additive. This is critical in developing an economically feasible bioplastic material like EarthPCB. Thermoplastic starch and plasticizer additives are expensive and could contain non-organic, non-biodegradable, non-compostable materials. The more organic biomaterials that are used to create a bioplastic, the better the opportunity to achieve biodegradation and biocomposting within the master batch resin. The heating of the final mixture results in the final master batch EarthPCB resin disclosed herein above. Thus, an advantage of the method of producing EarthPCB resin may be that the resin is economically feasible as a replacement to petroleum-based plastic can be used as a material to form numerous types of food and beverage containers, packaging, film, bags, cosmetic packaging, medical applications, pill bottle, nutrition supplements, commercial and industrial appliances, automotive, airline, basically any products that are similar to petroleum plastic products, could be made from EarthPCB. An additional advantage of the method may be that the resulting products will be recyclable, compostable and biodegradable.

The EarthPCB resin may be manufactured into any array of products and goods through, thermoforming, rotomolding, injection molding, extrusion blow molding, extrusion, film, bubble forming, vacuum framing, and extrusion pelletizing, as an example.

The EarthPCB resin may be pelletized via a process involving extrusion, cutting the extruded strands, and curing to produce a master batch bioplastic resin pellets. It should be understood that because of the mill grinding of each of the components that make up the composition, the curing process of the composition will be faster, and not require any pre-drying of the substrate components in order to extrude compound the EarthPCB composition into a pelletized master batch. This saves a tremendous amount of time and cost. It is common and known that many substrates and organic material such as PLA, PHA, PHB need to be pre-dried to extrude compound, as well when these bio resins like PLA, PHA, PHB are used, they need to be pre-dried before the injection molding, extrusion, extrusion blow molding, thermoforming and other well-known plastic processing are used to make bioplastic, as well petroleum-based plastic products. Whereas, EarthPCB does not need to be pre-dried before using, thus reducing the time to process bio resin, making it into bioplastic products. It should be noted that the milling of EarthPCB substrate components take time to mill (5 to 25 minutes) however that is much less time than pre-drying the substrates or resin material when processing. Pre-heating bio resin prior to use takes 24 to 48 hours, a much longer time than mixing say 5 to 25 minutes. Also, a tremendous amount of energy power either gas or electricity has to be used in the ovens that are pre-drying let's say PLA, PHA, PHB or other bio resins, where milling use less energy, thus reducing costs and time to manufacture and also reducing warehousing costs before production of the various products made of EarthPCB resin.

As is known to one of the ordinary skills in the art, pelletizing is the process of compressing, extruding, or molding the substrate into the shape of a small pellet. Those pellets can then be shipped to various manufacturers who use the pellets in the specific manufacturing process such as, injection molding, extrusion film, extrusion blow molding, thermoform, etc.

The melt flow rate of the EarthPCB substrate material under thermoforming is less than 1 g/10 min to 80 g/10 min (melt flow less than 1 to 80 g/10 min), which is a significant advantage in being able to produce a wide range of bioplastic products. Other bio resins (e.g., PLA, PHA, PHB) are not able to achieve this range of melt flow. Unlike the EarthPCB, the other bio resins do not poses the critical ability to easily adjust the melt flow rate. This is why PLA, PHA, PHB have limited use in plastics manufacturing, whereas EarthPCB can be used at all application of the plastic industry, but as a biodegradable, biocompostable, recyclable bioplastic. Thus, melt flow rate of EarthPCB substrate material under thermoforming process, as an example, can be in a range from about less than 1 to 80 g/10 min. No modifier is need in the form to achieve this melt flow range. It is attainable by just blending the EarthPCB substrate materials as listed above, thus reducing the cost of the resin because no extra substrate components are required. It should be noted that reducing the ratio of starch in the EarthPCB formula would increase the flow rate. It should be understood that impact modifiers or temperature modifiers could be added to the substrate to make an adjustment to the resin substrate's properties.

As an example, an impact modifier (e.g., Calcium Carbonate or CaSiO3—Wollastonite) could be added to the substrate to give the product more strength if produced from the EarthPCB resin disclosed herein. Impact modifiers are not known, or obvious to be added to a Green PE or Green PP. However, a substrate component as listed above, as well the EarthPCB composition could include impact modifiers or other additives that may be added to the EarthPCB substrate composition to add durability to products made from EarthPCB, and still achieve to goals for the EarthPCB composition to be biodegradable, biocompostable, recyclable.

The EarthPCB composition may be provided with a method of producing bioplastic made from EarthPCB resin, in an aspect. The method of producing the EarthPCB composition for forming bioplastic may first involve milling Green polyethylene or Green polypropylene and calcium carbonate into fine powders about 0.1 to 4.0 microns in diameter, and then mechanically mixing the two powders together, forming a first mixture. Hemp hurd, bamboo, fibers, grasses, cotton or wood fibers may be milled into a fine powder about 0.1 to 4.0 microns in diameter and then mechanically mixed and blended dry with no heat with the first mixture, forming a second mixture. Thus, it should be noted that no pre-drying of the substrate components is needed, as are resumed by other bio plastics like PLA, PHA, PHB. The second mixture does comprise the Green polyethylene or Green polypropylene, calcium carbonate and hemp hurd. It should be understood that food starch or protein particles or granulates, as an example (soy protein or pea protein, or potato starch, or tapioca starch) could replace the hemp hurd or be added with the hemp hurd, mixing hemp hurd and protein particles, powders, granulates. Then food starch such as potato, tapioca, corn, wheat may be milled to a fine granulated powder about 0.1 to 4.0 microns in diameter and may be mechanically mixed and blended dry with no heat or pre-drying of the substrate components with the second mixture, forming a third mixture. It should be understood that a biodegradation additive may be milled to a fine granulated powder about 0.1 to 4.0 microns in diameter and may be mechanically mixed and blended dry with no heat or pre-drying with the third mixture, forming a fourth mixture. Finally, the third and final mixture may be agitated-compounded at a temperature between about 220 and 430 degrees F. to thermodynamically activate and link material structures within each substrate copolymer, forming the EarthPCB master batch resin. Blending material structural components are linked in a linear or branched manner via the heating bonding process. The EarthPCB resin may be cured at about 220 and 430 degrees F. to form a master batch bioplastic in the form of a pelletized material. The EarthPCB pelletized material may then be used to form food, beverage, cosmetics, automotive, consumer good, straws, medical devices, electronic devices, nutrition powder packaging, pill bottles, basically any products that are currently made of regular plastic can be made from EarthPCB resin, as examples of products that could be produced by extruding, extruding blow molding, injection molding, thermoform, vacuum forming, rotomolding as examples of general plastic product manufacturing methods. Thus, am advantage of the EarthPCB resin may be that products currently made from regular plastic can now be made from compostable, biodegradable, recyclable resin.

Traditional petrochemical based plastic resin curing, and mixing methods involved first melting down pelletized forms of each ingredient that makes up the composition. As disclosed above, the method of producing the EarthPCB high performance, sustainable, renewable, low-carbon resin involves mixing all ingredients into a final mixture in a powdered form, rather than mixing melted down pellets. Thus, an advantage of the method disclosed above may be that each component making up the composition may be mixed and blended dry with no heat, or pre-drying of the components of the resin, and no pre-drying of the finished master batch resin before any manufacturing process of the material is done such as, injection molding, extrusion, extrusion blow molding, vacuum form, thermoform, rotomolding, etc., as an example.

It should be understood that the above described exemplary embodiments of the EarthPCB high performance, sustainable, renewable, less-polluting resin composition may be formulated and used specifically for a variety of applications. As an example, for the production of films for packaging, for example, soy protein may not be used but, milled hemp hurd, or bamboo grasses, Green polyethylene, calcium carbonate, natural food starches, and a biodegradation additive could be preferably used in the making of the EarthPCB high-performance, sustainable, renewable, low-carbon composition, as an example, since protein such as soy protein, pea protein could disrupt the integrity of the resulting film products.

It should be noted that including into the EarthPCB compositions disclosed herein organic components, such as food starch (that is pure, with no plasticizers or other additives), food protein or cellulosic material (e.g., wood or grass fibers) is critical to the acceleration of the biodegradation and composting processes.

It may be advantageous to set forth definitions of certain words and phrases used in this patent document. It should be understood that the terms "substrate," "composition," and "resin" are used herein interchangeably. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A composition for production of a bioplastic that is compostable and biodegradable, the composition comprising about 1 to 99% by weight of post-consumer recycled (PCR) resin, hemp hurd of about 6% by weight, wherein the hemp hurd is a fine powder about 0.25 to 0.75 microns in diameter, and about 0.5% to 10% biodegradation additive by weight.

2. A composition for production of a bioplastic that is compostable and biodegradable, the composition comprising plant-based polypropylene or plant-based polyethylene from about 15% to about 99% by weight, hemp hurd of about 6% by weight, wherein the hemp hurd is a fine powder about 0.25 to 0.75 microns in diameter, and biodegradation additive from about 0.5% to about 10% by weight.

3. The composition of claim 2 further comprising calcium carbonate (CaCO3) from about 0.5% to about 60% by weight.

4. The composition of claim 2 further comprising food-based starch from about 0.5% to about 85% by weight, wherein the food-based starch has no plasticizers.

5. The composition of claim 2 further comprising food-based protein from about 0.5% to about 85% by weight.

6. A composition for production of a bioplastic, the composition comprising about 50% to 99% plant-based polyethylene, PP-Polypropylene or plant-based polypropylene, by weight, and 0.5% to 5% biodegradation additive by weight; calcium carbonate from about 0.5% to about 60% by weight, food-based starch having no plasticizer, the food-based starch being from about 0.5% to about 85% by weight, and hemp hurd of about 6% by weight, wherein the hemp hurd is a fine powder about 0.25 to 0.75 microns in diameter.

7. The composition of claim 6 wherein the composition comprises 91% plant-based polyethylene by weight and 2% biodegradation additive by weight.

8. The composition of claim 6 wherein the composition comprises 90% plant-based polyethylene by weight and 3% biodegradation additive by weight.

9. The composition of claim 6 wherein the composition comprises 89% plant-based polyethylene by weight and 4% biodegradation additive by weight.

10. The composition of claim 6 wherein the composition comprises 90% plant-based polypropylene by weight and 3% biodegradation additive by weight.

11. The composition of claim 6 wherein the composition comprises 89% plant-based polypropylene by weight and 4% biodegradation additive by weight.

12. The composition of claim 6 wherein the composition comprises 92% polypropylene by weight and 1% biodegradation additive by weight.

* * * * *